United States Patent
Zhou

(10) Patent No.: US 11,864,125 B2
(45) Date of Patent: Jan. 2, 2024

(54) POWER CONFIGURATION METHOD, APPARATUS, DEVICE, AND SYSTEM FOR MULTI-BANDWIDTH TRANSMISSION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 366 days.

(21) Appl. No.: 17/310,603

(22) PCT Filed: Feb. 15, 2019

(86) PCT No.: PCT/CN2019/075285
§ 371 (c)(1),
(2) Date: Aug. 12, 2021

(87) PCT Pub. No.: WO2020/164144
PCT Pub. Date: Aug. 20, 2020

(65) Prior Publication Data
US 2022/0124632 A1    Apr. 21, 2022

(51) Int. Cl.
*H04B 7/00* (2006.01)
*H04W 52/24* (2009.01)
*H04W 52/14* (2009.01)

(52) U.S. Cl.
CPC ......... *H04W 52/24* (2013.01); *H04W 52/146* (2013.01)

(58) Field of Classification Search
CPC ............. H04W 52/0209; H04W 52/04; H04W 52/143; H04W 52/146; H04W 52/24; H04W 52/327
See application file for complete search history.

(56) References Cited

U.S. PATENT DOCUMENTS

| | | | | |
|---|---|---|---|---|
| 7,813,739 | B2* | 10/2010 | Teo | .......... H04L 5/006 455/425 |
| 9,301,261 | B2* | 3/2016 | Rudolf | .......... H04W 52/46 |
| 9,660,790 | B2* | 5/2017 | Lamy-Bergot | ........ H04W 16/14 |
| 2012/0052903 | A1 | 3/2012 | Han | |

(Continued)

FOREIGN PATENT DOCUMENTS

| | | |
|---|---|---|
| CN | 102595477 A | 7/2012 |
| CN | 102685869 A | 9/2012 |

(Continued)

OTHER PUBLICATIONS

International Search Report in the international application No. PCT/CN2019/075285, dated Nov. 12, 2019.

(Continued)

*Primary Examiner* — Tuan Pham
(74) *Attorney, Agent, or Firm* — Syncoda LLC; Feng Ma

(57) ABSTRACT

A power configuration method includes: a base station determining the configuration upper limit of an overall equivalent power value of a terminal when performing multi-bandwidth transmission on n bandwidths; the base station generating, for the terminal, configuration information of a first bandwidth among n bandwidths, the overall equivalent power value on the n bandwidths corresponding to the configuration information being not higher than the upper limit of the configuration; the base station sending configuration information to the terminal.

20 Claims, 10 Drawing Sheets

(56) References Cited

U.S. PATENT DOCUMENTS

| | | |
|---|---|---|
| 2013/0279343 A1 | 10/2013 | Jeong |
| 2014/0161081 A1 | 6/2014 | Han et al. |
| 2014/0307670 A1 | 10/2014 | Kim et al. |
| 2014/0321304 A1 | 10/2014 | Yu et al. |
| 2015/0156733 A1 | 6/2015 | Han et al. |
| 2016/0150423 A1 | 5/2016 | Jeong et al. |
| 2016/0242171 A1 | 8/2016 | Kim et al. |
| 2017/0280339 A1 | 9/2017 | Jeong et al. |
| 2018/0049188 A1 | 2/2018 | Kim et al. |
| 2018/0317180 A1 | 11/2018 | Li et al. |

FOREIGN PATENT DOCUMENTS

| | | |
|---|---|---|
| CN | 103220768 A | 7/2013 |
| CN | 103329602 A | 9/2013 |
| CN | 108702709 A | 10/2018 |
| CN | 109152030 A | 1/2019 |
| WO | 2014173329 A1 | 10/2014 |

OTHER PUBLICATIONS

English translation of the Written Opinion of the International Search Authority in the international application No. PCT/CN2019/075285, dated Nov. 12, 2019.

First Office Action of the Chinese application No. 201980000161.1, dated Aug. 11, 2021.

Supplementary European Search Report in the European application No. 19915562.3, dated Sep. 8, 2022.

ERICSSON: "Power sharing and power class for EN-DC in FR1", 3GPP Draft • R4-1804259 3rd Generation Partnership Project (3GPP), Mobile Competence Centre ; 650, Route Des Lucioles— F-06921 Sophia-Antipolis Cedex •France vol. TSG RAN, No. Melbourne, Australia; Apr. 16, 2018-Apr. 20, 2018 Apr. 6, 2018 (Apr. 6, 2018), XP051417937.

* cited by examiner

POWER CONFIGURATION METHOD, APPARATUS, DEVICE, AND SYSTEM FOR MULTI-BANDWIDTH TRANSMISSION

CROSS-REFERENCE TO RELATED APPLICATION

This application is a U.S. national stage of International Application No. PCT/CN2019/075285 filed on Feb. 15, 2019, the disclosure of which is hereby incorporated by reference in its entirety.

TECHNICAL FIELD

The present disclosure relates to the field of communication, and more particularly, to a power configuration method, apparatus, device, and system for multi-bandwidth transmission.

BACKGROUND

The magnitude of uplink transmit power of a terminal is classified according to a power class (PC) when new radio (NR) and long-term evolution (LTE) are collaboratively deployed. For example, transmit power of PC3 is 23 dBm. Higher transmit power needs to be introduced in a relatively high frequency class such as 3.5 GHz and the like, to ensure the enlargement of an uplink coverage. For example, transmit power of PC2 is 26 dBm. A terminal classified into a PC higher than PC3 is called high power user equipment (UE) (HPUE).

Specific absorption rate (SAR) refers to an index of measuring a radiant quantity of a terminal to a human body when transmitting a wireless signal in a terminal design. The SAR and an over-the-air technology (OTA) index corresponding to the transmission capability are a pair of conflicting indexes. The transmission capability of UE needs to exceed the transmission capability indicated by the OTA index, but cannot exceed a radiation requirement of the SAR.

The above-mentioned condition becomes more complex when UE simultaneously adopts more than two bandwidths for uplink transmission, e.g., in a carrier aggregation scene. For example, bandwidths of time division multiplexing (TDD) or frequency division multiplexing (FDD) of LTE and NR of different uplink transmission duty cycles (or called different duty cycles) are aggregated for networking, duty cycles of different bandwidths may be different, and a SAR value may exceed the standard in some time windows after uplink transmissions on multiple bandwidths are superposed.

SUMMARY

Embodiments of the present disclosure provide a power configuration method, apparatus, device, and system for multi-bandwidth transmission. The technical solutions are implemented as follows.

According to an aspect of embodiments of the present disclosure, a power configuration method for multi-bandwidth transmission is provided, which may include: a base station determines a configuration upper limit of an overall equivalent power value of a terminal during multi-bandwidth transmission on n bandwidths, n being an integer greater than 1; the base station generates configuration information of a first bandwidth in the n bandwidths for the terminal, the overall equivalent power value corresponding to the configuration information on the n bandwidths being not higher than the configuration upper limit; and the base station sends the configuration information to the terminal, the configuration information being configured to configure a power configuration parameter for uplink sending of the terminal on the first bandwidth.

In some embodiments, the operation that the base station generates the configuration information of the first bandwidth in the n bandwidths for the terminal may include: the base station acquires an equivalent power value of the terminal corresponding to each bandwidth in the n bandwidths, the n bandwidths comprising the first bandwidth that is presently configured; the base station calculates the overall equivalent power value of the terminal according to the equivalent power value and a specified duty cycle of the terminal corresponding to each bandwidth; and the base station generates the configuration information of the first bandwidth in response to determining that the overall equivalent power value is not higher than the configuration upper limit, the configuration information of the first bandwidth being configured to configure a first power value and/or a first duty cycle of the terminal on the first bandwidth.

In some embodiments, the operation that the base station calculates the overall equivalent power value of the terminal according to the equivalent power value and the specified duty cycle of the terminal corresponding to each bandwidth may include: for each bandwidth in the n bandwidths, the equivalent power value, the specified duty cycle, and an evaluation time window corresponding to the bandwidth are multiplied to acquire a first product corresponding to the bandwidth, and the first products corresponding to the n bandwidths respectively are accumulated to acquire the overall equivalent power value; or, for each bandwidth in the n bandwidths, the equivalent power value and the specified duty cycle corresponding to the bandwidth are multiplied to acquire a second product corresponding to the bandwidth, and the second products corresponding to the n bandwidths respectively are accumulated to acquire the overall equivalent power value.

In some embodiments, for a jth bandwidth in the n bandwidths, an equivalent power value corresponding to the jth bandwidth may be equal to:

$$P_{eq\_Band\_j} = (DC_{p1} \times P_1 \times T_1 + DC_{p2} \times P_2 \times T_2 + DC_{p3} \times P_3 \times T_3 + \ldots + DC_{pi} \times P_i \times T_i + \ldots DC_{pn} \times P_n \times T_n) / (DC_{as\_j} \times T_{window}),$$

where $P_{eq\_Band\_j}$ may be the equivalent power value corresponding to the jth bandwidth under the specified duty cycle, $DC_{as\_j}$ may be the specified duty cycle corresponding to the jth bandwidth, $T_{window}$ may be a whole evaluation time window, $DC_{pi}$ may be a duty cycle in an ith sub evaluation time period, $P_i$ may be power corresponding to a practical PC in the ith sub evaluation time period, and $T_i$ may be the ith sub evaluation time period, each sub evaluation time period being non-overlapping.

In some embodiments, the operation that the base station acquires the equivalent power value of the terminal corresponding to each bandwidth in the n bandwidths may include: the equivalent power value corresponding to each bandwidth is calculated according to a default duty cycle and a preset power value corresponding to each bandwidth in the n bandwidths.

In some embodiments, the operation that the base station acquires the equivalent power value of the terminal corresponding to each bandwidth in the n bandwidths may include: in response to determining that the first power value and the first duty cycle corresponding to the first bandwidth need to be adjusted, at least one of the first power value or the first duty cycle corresponding to the first bandwidth is adjusted according to an adjustment requirement, and the equivalent power value corresponding to the first bandwidth is calculated according to the first power value and the first duty cycle; and a second power value and a second duty cycle corresponding to a second bandwidth, except the first bandwidth, in the n bandwidths are acquired, and the equivalent power value corresponding to the second bandwidth is calculated according to the second power value and the second duty cycle; or, an equivalent power value corresponding to the second bandwidth, except the first bandwidth, in the n bandwidths is acquired.

In some embodiments, the method may further include: the base station decreases the second power value and/or the second duty cycle corresponding to the second bandwidth in response to determining that the overall equivalent power value is higher than the configuration upper limit.

In some embodiments, the method may further include: the base station refuses to adjust the second power value and/or the second duty cycle corresponding to the second bandwidth in response to determining that a decreasing frequency is higher than a preset frequency and the overall equivalent power value is still higher than the configuration upper limit.

In some embodiments, the method may further include: the base station decreases the first equivalent power value and/or the first duty cycle corresponding to the first bandwidth in response to determining that the overall equivalent power value is higher than the configuration upper limit and a service priority of the second bandwidth is higher than a service priority of the first bandwidth.

In some embodiments, the method may further include: a remaining equivalent power value quota is calculated according to the configuration upper limit and the overall equivalent power value in response to determining that the overall equivalent power value is not higher than the configuration upper limit; at least one of a third power value or a third duty cycle corresponding to a third bandwidth is adjusted according to an adjustment requirement in response to determining that an equivalent power value and a duty cycle corresponding to the third bandwidth need to be adjusted; an increment of the equivalent power value corresponding to the third bandwidth is calculated according to the third power value and/or the third duty cycle corresponding to the third bandwidth; and configuration information of the third bandwidth is generated in response to determining that the increment of the equivalent power value corresponding to the third bandwidth is not higher than the remaining equivalent power value quota, configuration information of uplink transmit power being configured to configure the third power value and/or the third duty cycle of the terminal on the third bandwidth.

In some embodiments, the operation that the base station determines the configuration upper limit of the overall equivalent power value of the terminal during multi-bandwidth transmission on the n bandwidths may include: the base station receives the configuration upper limit of the overall equivalent power value from the terminal.

In some embodiments, the operation that the base station determines the configuration upper limit of the overall equivalent power value of the terminal during multi-bandwidth transmission on the n bandwidths may include: the base station receives a second sub configuration upper limit, from the terminal, corresponding to each bandwidth in the n bandwidths during multi-bandwidth transmission under a specified duty cycle; and the base station determines the configuration upper limit of the overall equivalent power value according to the second sub configuration upper limit corresponding to each bandwidth during multi-bandwidth transmission under the specified duty cycle.

In some embodiments, the operation that the base station determines the configuration upper limit of the overall equivalent power value according to the second sub configuration upper limit corresponding to each bandwidth during multi-bandwidth transmission under the specified duty cycle may include: the base station multiplies the second sub configuration upper limit, the specified duty cycle, and an evaluation time window corresponding to each bandwidth during multi-bandwidth transmission under a preset duty cycle to acquire a third product, and the base station adds the third products to determine the configuration upper limit of the overall equivalent power value; or, the base station multiplies the second sub configuration upper limit and the specified duty cycle corresponding to each bandwidth during multi-bandwidth transmission under a preset duty cycle to acquire a fourth product, and the base station adds the fourth products to determine the configuration upper limit of the overall equivalent power value.

In some embodiments, the operation that the base station determines the configuration upper limit of the overall equivalent power value of the terminal during multi-bandwidth transmission on the n bandwidths may include: the base station receives a first sub configuration upper limit, from the terminal, corresponding to each bandwidth in the n bandwidths during independent work under a specified duty cycle; the base station determines a second sub configuration upper limit corresponding to each bandwidth during multi-bandwidth transmission according to the first sub configuration upper limit corresponding to each bandwidth during independent work under the specified duty cycle, the second sub configuration upper limit being lower than the first sub configuration upper limit; and the base station determines the configuration upper limit of the overall equivalent power value according to the specified duty cycle and the second sub configuration upper limit corresponding to each bandwidth during multi-bandwidth transmission.

In some embodiments, the operation that the base station determines the second sub configuration upper limit corresponding to each bandwidth during multi-bandwidth transmission according to the first sub configuration upper limit corresponding to each bandwidth during independent work under the specified duty cycle may include: the base station calculates an average value of the first sub configuration upper limits of equivalent power values corresponding to the n bandwidths during independent work under corresponding PCs, and determines a quotient of the average value and n as the second sub configuration upper limit corresponding to each bandwidth during multi-bandwidth transmission; or, the base station calculates a maximum value of the first sub configuration upper limits of equivalent power values corresponding to the n bandwidths during independent work under corresponding PCs, and determines a quotient of the maximum value and n as the second sub configuration upper limit corresponding to each bandwidth during multi-bandwidth transmission; or, the base station calculates a minimum value of the first sub configuration upper limits of equivalent power values corresponding to the n bandwidths during independent work under corresponding PCs, and determines a quotient of the minimum value and n as the second sub configuration upper limit corresponding to each bandwidth during multi-bandwidth transmission; or, the base station calculates an average value of the first sub configuration upper limits of equivalent power values corresponding to the n bandwidths during independent work under corresponding PCs, and determines n divided values acquired by dividing the average value according to n weights as the second sub configuration upper limits corresponding to the n bandwidths during multi-bandwidth transmission, the n weights corresponding to the n bandwidths one to one, and a sum of the n weights being 1; or, the base station calculates a maximum value of the first sub configuration upper limits of equivalent power values corresponding to the n bandwidths during independent work under corresponding PCs, and determines n divided values acquired by dividing the maximum value according to n weights as the second sub configuration upper limits corresponding to the n bandwidths during multi-bandwidth transmission, the n weights corresponding to the n bandwidths one to one, and a sum of the n weights being 1; or, the base station calculates a minimum value of the first sub configuration upper limits of equivalent power values corresponding to the n bandwidths during independent work under corresponding PCs, and determines n divided values acquired by dividing the minimum value according to n weights as the second sub configuration upper limits corresponding to the n bandwidths during multi-bandwidth transmission, the n weights corresponding to the n bandwidths one to one, and a sum of the n weights being 1.

According to another aspect of embodiments of the present disclosure, a power configuration method for multi-bandwidth transmission is provided, which may include: a terminal receives configuration information sent by a base station, an overall equivalent power value corresponding to the configuration information on n bandwidths for multi-band transmission being not higher than a configuration upper limit; and the terminal determines a power configuration parameter for uplink sending on a first bandwidth according to the configuration information, the first bandwidth being one or more of the n bandwidths for multi-bandwidth transmission of the terminal, and an overall equivalent duty cycle on the n bandwidths being not higher than the configuration upper limit.

In some embodiments, before the operation that the terminal receives the configuration information sent by the base station, the method may further include: the terminal reports the configuration upper limit of the overall equivalent power value to the base station; or, the terminal reports a second sub configuration upper limit corresponding to each bandwidth in the n bandwidths under a specified duty cycle to the base station; or, the terminal reports a first sub configuration upper limit of a power value corresponding to each bandwidth in the n bandwidths during independent work under a specified duty cycle to the base station.

In some embodiments, before the operation that the terminal reports the second sub configuration upper limit corresponding to each bandwidth in the n bandwidths under a specified duty cycle to the base station, the method may further include: the terminal calculates the second sub configuration upper limit corresponding to each bandwidth in the n bandwidths under the specified duty cycle according to a sub power value upper limit corresponding to a jth bandwidth in the n bandwidths in an ith sub evaluation time period, a corresponding duty cycle, and the corresponding ith sub evaluation time period.

According to another aspect of embodiments of the present disclosure, a power configuration apparatus for multi-bandwidth transmission is provided, which may be applied to a base station and include: a processing module, configured to determine a configuration upper limit of an overall equivalent power value of a terminal during multi-bandwidth transmission on n bandwidths, n being an integer greater than 1; the processing module being configured to generate configuration information of a first bandwidth in the n bandwidths for the terminal, the overall equivalent power value corresponding to the configuration information on the n bandwidths being not higher than the configuration upper limit; and a sending module, configured to send the configuration information to the terminal, the configuration information being configured to configure a power configuration parameter for uplink sending of the terminal on the first bandwidth.

According to another aspect of embodiments of the present disclosure, a power configuration apparatus for multi-bandwidth transmission is provided, which may be applied to a terminal and include: a receiving module, configured to receive configuration information sent by a base station, an overall equivalent power value corresponding to the configuration information on n bandwidths for multi-band transmission being not higher than a configuration upper limit; and a processing module, configured to determine a power configuration parameter for uplink sending on a first bandwidth according to the configuration information, the first bandwidth being one or more of the n bandwidths for multi-bandwidth transmission of the terminal, and an overall equivalent duty cycle on the n bandwidths being not higher than the configuration upper limit.

According to another aspect of embodiments of the present disclosure, a base station is provided, which may include: a processor; and a transceiver coupled with the processor; the processor may be configured to load and execute executable instructions to implement the power configuration method for multi-bandwidth transmission as described in the first aspect.

According to another aspect of embodiments of the present disclosure, a terminal is provided, which may include: a processor; and a transceiver coupled with the processor; the processor may be configured to load and execute executable instructions to implement the power configuration method for multi-bandwidth transmission as described in the second aspect.

According to another aspect of embodiments of the present disclosure, there is provided a computer-readable storage medium having stored therein at least one instruction, at least one segment of program, a code set or an instruction set, which is loaded and executed by a processor to implement the power configuration method for multi-bandwidth transmission as described in any above-mentioned aspect.

The technical solutions provided in the embodiments of the present disclosure may have the following beneficial effects.

In a multi-bandwidth transmission scene of the terminal, the equivalent power values of the terminal on the n bandwidths are combined into the overall equivalent power value of the whole terminal, and the configuration upper limit of the overall equivalent power value is adopted as a criterion of determining whether a SAR exceeds the standard, so that the base station, when generating the configuration information of the first bandwidth in the n bandwidths for the terminal, may make a reasonable configuration based on the unified configuration upper limit of the overall equivalent power value to ensure that the overall equivalent power value on the n bandwidths allocated for the terminal to use is not higher than the configuration upper limit. Therefore, the problem that the SAR exceeds the standard in some time windows is reduced or solved.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
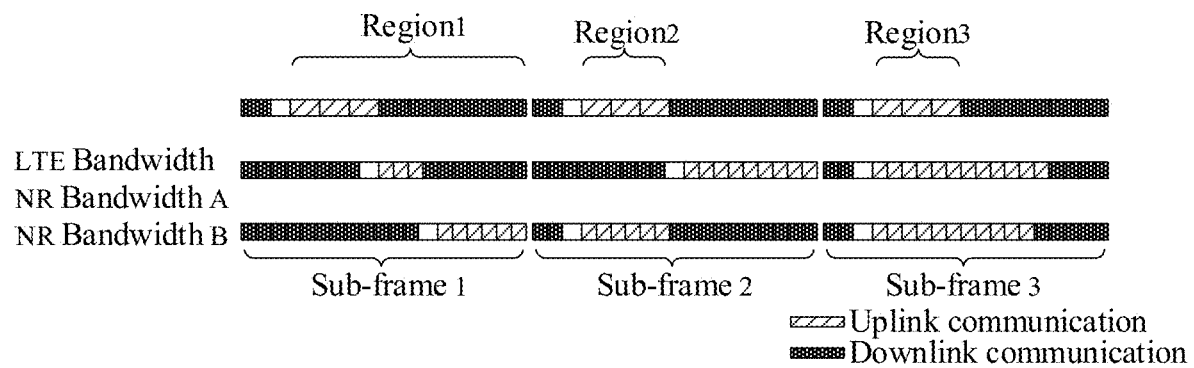
FIG. 1 is a schematic diagram illustrating a multi-bandwidth transmission scene, according to a related art.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A plurality of related terms involved in embodiments of the present disclosure are briefly introduced as follows.

Multi-bandwidth transmission refers to a transmission manner in which a terminal performs uplink transmission to a base station using more than two bandwidths at the same time. Typical multi-bandwidth transmission includes, but not limited to, a carrier aggregation scene, a scene in which multiple uplink active bandwidth parts (BWPs) and/or sub-bands are configured for a terminal in an NR system, etc. In embodiments of the present disclosure, descriptions are made mainly taking multi-bandwidth transmission in the carrier aggregation scene as an example.

Carrier aggregation may refer to continuous carrier aggregation or discontinuous carrier aggregation. In embodiments of the present disclosure, carrier aggregation refers to that a terminal transmits signals to a base station using carriers of more than two different frequency bands.

Duty cycle refers to a ratio of uplink transmission time to total time (uplink transmission time plus downlink reception time) in a sub-frame.

The magnitude of uplink transmit power of a terminal is classified according to a PC when NR and LTE are collaboratively deployed. For example, transmit power of PC3 is 23 dBm (i.e., decibels relative to one milliwatt). Higher transmit power needs to be introduced to a relatively high frequency class such as 3.5 GHz and the like, to ensure the enlargement of an uplink coverage. For example, transmit power of PC2 is 26 dBm. A terminal classified into a PC higher than PC3 is called HPUE. Different PCs correspond to different PCs, and different PCs correspond to different SARs.

SAR refers to an index of measuring a radiant quantity of a terminal to a human body when transmitting a wireless signal in a terminal design. The SAR and an OTA index corresponding to the transmission capability are a pair of conflicting indexes. The transmission capability of UE needs to exceed the transmission capability indicated by the OTA index, but cannot exceed a radiation requirement of the SAR.

HPUE may bring the problem that the SAR exceeds the standard. That is, radiations accumulated in a certain period of time may exceed the radiation requirement of the SAR in case of a relatively high PC. In a carrier aggregation scene, bandwidths of TDD or FDD of LTE and NR of different PCs are aggregated for networking, and PCs of different bandwidths may be different, so a SAR value may exceed the standard in some time windows, and the condition becomes more complex. Alternatively, in a non-carrier aggregation scene, multiple bandwidths allocated for a terminal to use are all in an uplink sending state, which may also make a SAR value exceed the standard in some time windows.

As illustrated in FIG. 1, an LTE bandwidth, NR bandwidth A, and NR bandwidth B have their own uplink/downlink configurations. In case of not considering factors such as the duty cycle and the power, a terminal performs uplink transmission on the three bandwidths in a time period of region 3, which easily makes the SAR exceed the standard. In case of performing uplink transmission on NR bandwidth B using a high PC, transmit power on NR bandwidth B is superposed with transmit power on the LTE bandwidth in a time period of region 2, which also easily makes the SAR exceed the standard. In case of studying with a relatively large time window, for example, taking frame as the unit of the time window, excessive uplink configuration in frame 3 in FIG. 1 also easily makes the SAR exceed the standard.

The present disclosure provides a power configuration method for multi-bandwidth transmission. Power values on multiple bandwidths are matched in a scene of multi-bandwidth transmission on n bandwidths, thereby controlling uplink transmit power of a terminal to avoid a SAR exceeding the standard.

In embodiments of the present disclosure, an equivalent power value corresponding to a single bandwidth and an overall equivalent power value are proposed. Related introductions are as follows.

The equivalent power value corresponding to the single bandwidth is a numerical value configured to equivalently measure a power value of the terminal on the single bandwidth during uplink transmission. The numerical value may be used as a criterion of determining whether a SAR exceeds the standard on the single bandwidth.

In a calculation manner for the equivalent power value corresponding to the single bandwidth, the single bandwidth is, for example, the jth bandwidth, a whole evaluation time window includes n sub time windows, and the terminal correspondingly uses n duty cycles and n PCs in the n sub time windows on the jth bandwidth respectively. A PC corresponds to a piece of uplink transmit power. For example, power of PC2 is 26 dBm (i.e., decibels relative to one milliwatt), and power of PC3 is 23 dBm.

For the jth bandwidth in the n bandwidths, an equivalent power value corresponding to the jth bandwidth is equal to:

$$P_{eq\_Band\_j} = (DC_{p1} \times P_1 T_1 + DC_{p2} \times P_2 \times T_2 + DC_{p3} \times P_3 \times T_3 + \ldots + DC_{pi} \times P_i \times T_i + \ldots + DC_{pn} \times P_n \times T_n) / (DC_{as\_j} \times T_{window})$$ Formula 1, where $P_{eq\_Band\_j}$ is the equivalent power value corresponding to the jth bandwidth under a specified duty cycle, $DC_{as\_j}$ is the specified duty cycle corresponding to the jth bandwidth, $T_{window}$ is the whole evaluation time window, $DC_{pi}$ is a practical duty cycle in an ith sub evaluation time period, $P_i$ is power corresponding to a practical PC in the ith sub evaluation time period, and $T_i$ is the ith sub evaluation time period. Each sub evaluation time period is non-overlapping, and i is an integer not greater than n. A practical PC in each sub evaluation time period may be the same or different. A practical duty cycle in each sub evaluation time period may be the same or different.

Optionally, a specified duty cycle corresponding to a single bandwidth is configured by a base station or determined according to a predefinition manner. Each bandwidth corresponds to the same or different specified duty cycle. For example, for the jth bandwidth, any one of practical duty cycles used by the terminal on the jth bandwidth may be determined as the specified duty cycle, or a minimum value in the practical duty cycles used by the terminal on the jth bandwidth is determined as the specified duty cycle, or a maximum value in the practical duty cycles used by the terminal on the jth bandwidth is determined as the specified duty cycle, or a predefined duty cycle is determined as the specified duty cycle. For example, 50% is determined as the specified duty cycle, 75% is determined as the specified duty cycle, or 100% is determined as the specified duty cycle.

The overall equivalent power value is a numerical value configured to equivalently measure power of the whole terminal during multi-bandwidth transmission on the n bandwidths. Optionally, the overall equivalent power value is calculated based on an equivalent power value of the terminal corresponding to each bandwidth in the n bandwidths. The numerical value may be used as a criterion of determining whether the SAR of the whole terminal exceeds the standard in the multi-bandwidth transmission scene.

In a first calculation manner for the overall equivalent power value, for each bandwidth in the n bandwidths, the equivalent power value, the specified duty cycle, and an evaluation time window corresponding to the bandwidth are multiplied to acquire a first product corresponding to the bandwidth, and the first products corresponding to the n bandwidths respectively are accumulated to acquire the overall equivalent power value, namely:

$$P_{eq} = (P_{eq\_Band\_1} \times DC_{as\_1} \times T_{window} + P_{eq\_Band\_2} \times DC_{as\_2} \times T_{window} + P_{eq\_Band\_3} \times DC_{as\_3} \times T_{window} + \ldots + P_{eq\_Band\_j} \times DC_{as\_j} \times S_{window} + \ldots P_{eq\_Band\_n} \times DC_{as\_n} \times T_{window}) / (DC_{as} \times T_{window})$$ Formula 2, where $P_{eq}$ is the overall equivalent power value of the terminal, $DC_{as}$ is a specified duty cycle corresponding to the whole terminal, $P_{eq\_Band\_j}$ is the equivalent power value corresponding to the jth bandwidth under the specified duty cycle $DC_{as\_j}$, $DC_{as\_j}$ is the specified duty cycle corresponding to the jth bandwidth, $T_{window}$ is the whole evaluation time window, and $P_{eq\_Band\_j} \times DC_{as\_j} \times T_{window}$ represents the first product.

In a second calculation manner for the overall equivalent power value, for each bandwidth in the n bandwidths, the equivalent power value and the specified duty cycle corresponding to the bandwidth are multiplied to acquire a second product corresponding to the bandwidth, and the second products corresponding to the n bandwidths respectively are accumulated to acquire the overall equivalent power value, namely:

$$P_{eq} = (P_{eq\_Band\_1} \times DC_{as\_1} + P_{eq\_Band\_2} \times DC_{as\_2} + P_{eq\_Band\_3} \times DC_{as\_3} + \ldots + P_{eq\_Band\_j} \times DC_{as\_j} + \ldots P_{eq\_Band\_n} \times DC_{as\_n}) / DC_{as}$$ Formula 3, where $P_{eq}$ is the overall equivalent power value of the terminal, $DC_{as}$ is a specified duty cycle corresponding to the whole terminal, $P_{eq\_Band\_j}$ is the equivalent power value corresponding to the jth bandwidth under the specified duty cycle $DC_{as\_j}$, $DC_{as\_j}$ is the specified duty cycle corresponding to the jth bandwidth, and $P_{eq\_Band\_j} \times DC_{as\_j}$ represents the second product.

Figure 2:
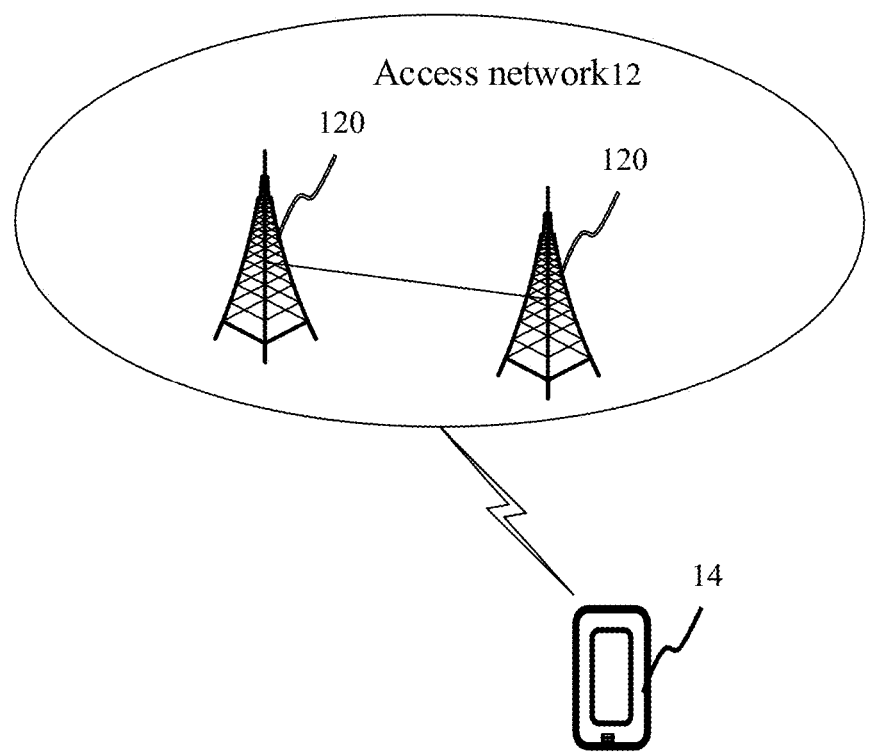
FIG. 2 is a block diagram of a communication system, according to an exemplary embodiment.

FIG. 2 is a block diagram of a communication system, according to an exemplary embodiment of the present disclosure. The communication system may be a 5th-generation (5G) NR system. The communication system may include an access network 12 and a terminal 14.

The access network 12 includes a plurality of access network devices 120. The access network device 120 communicates with a core network device 110 through a certain interface technology, e.g., an S1 interface in an LTE system and an NG system in the 5G NR system. The access network device 120 may be a base station. The base station is an apparatus deployed in the access network to provide a wireless communication function for the terminal. The base station may include various forms of macro base stations, micro base stations, relay stations, access points, etc. A device with a base station function may have different names in systems adopting different radio access technologies. For example, the device is called an evolved NodeB (eNodeB or eNB) in the LTE system and is also called a gNodeB or gNB in the 5G NR system. With the evolution of communication technologies, the description of name "base station" may be changed.

The terminal 14 may include various handheld devices having wireless communication functions, vehicle-mounted devices, wearable devices, computing devices, or other processing devices connected to wireless modems, and various forms of UE, mobile stations (MSs), terminal devices, etc. For the ease of description, the above-mentioned devices are all called terminals. The access network device 120 intercommunicates with the terminal 14 through a radio technology, such as a Uu interface.

Figure 3:
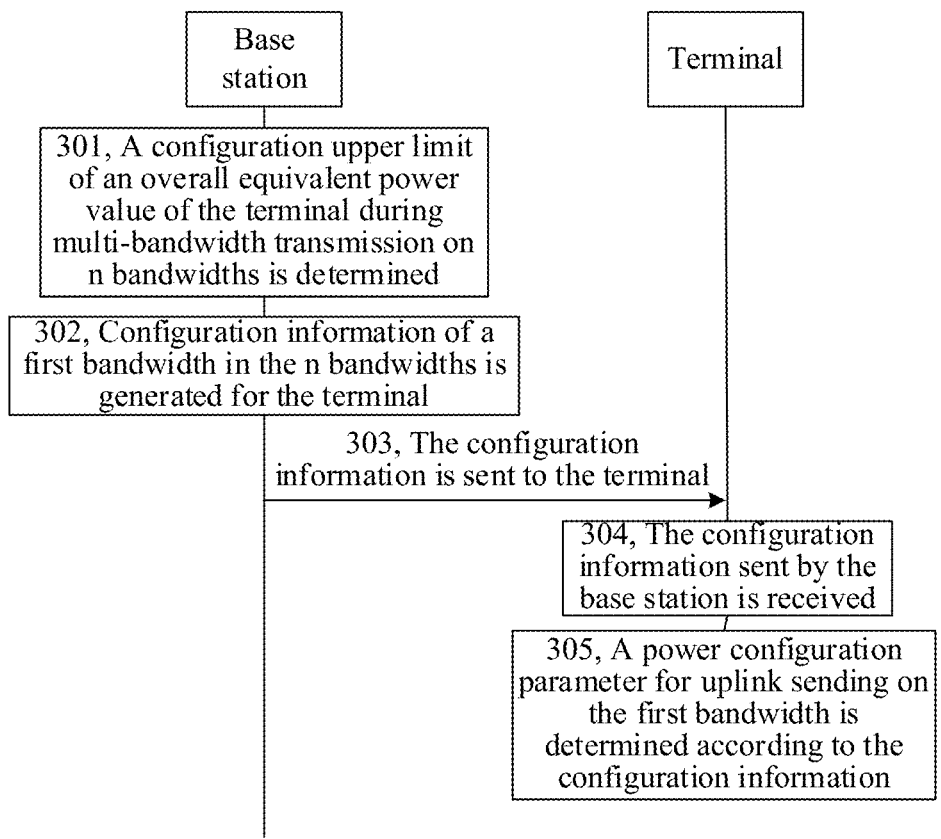
FIG. 3 is a flowchart showing a power configuration method for multi-bandwidth transmission, according to an exemplary embodiment.

FIG. 3 is a flowchart showing a power configuration method for multi-bandwidth transmission, according to an exemplary embodiment. The method may be executed by the communication system illustrated in FIG. 2. The method includes the following steps.

In step 301, a base station determines a configuration upper limit of an overall equivalent power value of a terminal during multi-bandwidth transmission on n bandwidths.

The terminal adopts the n bandwidths for multi-band transmission, and n is an integer greater than 1.

Optionally, the multi-bandwidth transmission on the n bandwidths includes: multi-bandwidth transmission in carrier aggregation and/or multi-bandwidth transmission in non-carrier aggregation. The multi-bandwidth transmission may also be called another possible description such as multi-bandwidth simultaneous transmission, multi-bandwidth collaborative transmission, and multi-bandwidth cooperative transmission, and no limits are made thereto in the present disclosure.

The overall equivalent power value refers to a power value acquired by combining n equivalent power values corresponding to the terminal during uplink transmission on the n bandwidths under a specified duty cycle. Optionally, the overall equivalent power value is calculated according to the equivalent power value of the terminal corresponding to the n bandwidths respectively. A configuration upper limit of the overall equivalent power value is a criterion configured to determine whether a SAR exceeds the standard.

The configuration upper limit of the overall equivalent power value may be configured by a base station, or reported by the terminal to the base station.

In step 302, the base station generates configuration information of a first bandwidth in the n bandwidths for the terminal.

The first bandwidth is a bandwidth which presently needs to be configured in the n bandwidths. The first bandwidth is all or part of the n bandwidths. The number of the first bandwidth is not limited in the present disclosure.

The base station generates the configuration information of the first bandwidth for the terminal. The configuration information is configured to configure a power configuration parameter during uplink sending of the terminal on the first bandwidth. The power configuration parameter includes a PC and/or a duty cycle.

The base station generates the configuration information of the first bandwidth in the n bandwidths for the terminal, and the overall equivalent power value corresponding to the configuration information on the n bandwidths is not higher than the configuration upper limit. That is, the overall equivalent power value of the terminal configured with the configuration information during uplink transmission on the n bandwidths is not higher than the configuration upper limit.

In step 303, the base station sends the configuration information to the terminal.

The base station sends the generated configuration information of the first bandwidth to the terminal. The configuration information is configured to configure the power configuration parameter for uplink sending of the terminal on the first bandwidth.

Optionally, the configuration information includes configuration information of one or more first bandwidths, configured to configure power configuration parameters for uplink sending of the terminal on the one or more first bandwidths.

In step 304, the terminal receives the configuration information sent by the base station.

In step 305, the terminal determines a power configuration parameter for uplink sending on the first bandwidth according to the configuration information.

The power configuration parameter includes at least one of: a duty cycle for uplink sending of the terminal on the first bandwidth, or a PC for uplink sending of the terminal on the first bandwidth.

In summary, according to the method provided in the embodiment, in a multi-bandwidth transmission scene of the terminal, the equivalent power values of the terminal on the n bandwidths are combined into the overall equivalent power value of the whole terminal, and the configuration upper limit of the overall equivalent power value is adopted as the criterion of determining whether a SAR exceeds the standard, so that the base station, when generating the configuration information of the first bandwidth in the n bandwidths for the terminal, may make a reasonable configuration based on the unified configuration upper limit of the overall equivalent power value to ensure that the overall equivalent power value on the n bandwidths allocated for the terminal to use is not higher than the configuration upper limit. Therefore, the problem that the SAR exceeds the standard in some time windows is reduced or solved.

In an optional embodiment based on the embodiment illustrated in FIG. 3, the process that the base station generates the configuration information of the first bandwidth in the n bandwidths for the terminal (step 302) may include the following steps.

In step 3021, the base station acquires an equivalent power value of the terminal corresponding to each bandwidth in the n bandwidths.

When required to configure the first bandwidth in the n bandwidths, the base station may preliminarily generate a first power value and first duty cycle corresponding to the first bandwidth according to at least one factor of a service, a coverage, power consumption, an antenna configuration, or the like. The first power value refers to practical transmit power of the terminal during uplink transmission on the first bandwidth.

A calculation manner for an equivalent power value corresponding to a single bandwidth is as above formula 1.

The equivalent power value corresponding to each bandwidth in the n bandwidths may be calculated independently by the base station. For example, the equivalent power value corresponding to the first bandwidth may be calculated by the base station, or may be calculated and reported to the base station by the terminal. For example, an equivalent power value corresponding to a second bandwidth except the first bandwidth may be calculated in advance and reported to the base station by the terminal. No limits are made thereto in the embodiment.

In step 3022, the base station calculates the overall equivalent power value of the terminal according to the equivalent power value and a specified duty cycle of the terminal corresponding to each bandwidth.

The base station calculates the overall equivalent power value of the terminal according to formula 2 or formula 3 after acquiring the equivalent power value and the specified duty cycle corresponding to each bandwidth.

The specified duty cycle $DC_{as}$ corresponding to the whole terminal in formula 2 or formula 3 is configured by the base station, or determined according to a predefinition manner. For example, any one of practical duty cycles used by the terminal on the n bandwidths may be determined as the specified duty cycle, or a minimum value in the practical duty cycles used by the terminal on the n bandwidths is determined as the specified duty cycle, or a maximum value in the practical duty cycles used by the terminal on the n bandwidths is determined as the specified duty cycle, or a predefined duty cycle is determined as the specified duty cycle.

In step 3023, whether the overall equivalent power value is higher than the configuration upper limit is determined.

That is, the base station predicts whether the SAR of the terminal exceeds the standard after present configuration.

Step 3024 is executed when the overall equivalent power value is not higher than the configuration upper limit.

Step 3025 is executed when the overall equivalent power value is higher than the configuration upper limit.

In step 3024, the configuration information of the first bandwidth is generated when the overall equivalent power value is not higher than the configuration upper limit.

Optionally, the base station generates the configuration information of the first bandwidth according to the first duty cycle and/or first power value corresponding to the first bandwidth when the overall equivalent power value is not higher than the configuration upper limit. For example, the configuration information of the first bandwidth is generated according to the item that changes in the first duty cycle and the first power value.

In step 3025, the configuration information of the first bandwidth is regenerated when the overall equivalent power value is higher than the configuration upper limit.

When the overall equivalent power value is higher than the configuration upper limit, the base station decreases the first duty cycle and/or first power value corresponding to the first bandwidth, recalculates the overall equivalent power value of the terminal, reenters step 3023, and generates the configuration information of the first bandwidth according to the first duty cycle and/or first power value corresponding to the first bandwidth until the overall equivalent power value of the terminal is not higher than the configuration upper limit.

Figure 4:
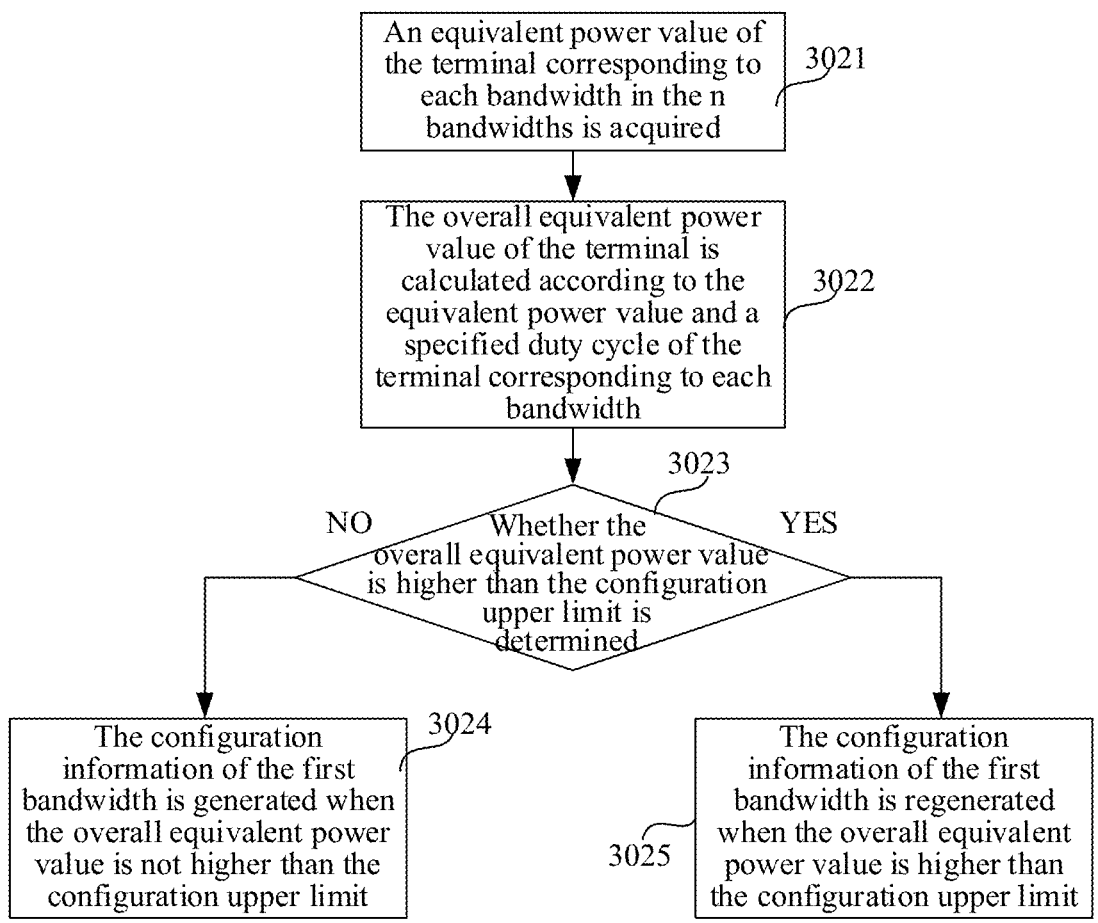
FIG. 4 is a flowchart showing a power configuration method for multi-bandwidth transmission, according to another exemplary embodiment.

It is to be noted that, in an embodiment illustrated in FIG. 4, the operation that the base station acquires an equivalent power value of the terminal corresponding to each bandwidth in the n bandwidths includes the following two conditions.

The first is how the base station acquires the equivalent power value of the terminal corresponding to each bandwidth in the n bandwidths when the terminal just accesses a network.

The second is how the base station acquires the equivalent power value of the terminal corresponding to each bandwidth in the n bandwidths when the base station needs to adjust one or more bandwidths in the n bandwidths after the terminal has accessed the network.

Under the first condition, since there is a corresponding default duty cycle and a preset power value for a bandwidth allocated to the terminal that just accesses the network, the base station calculates the equivalent power value corresponding to each bandwidth according to a default duty cycle and preset PC corresponding to each bandwidth in the n bandwidths.

Under the second condition, when the terminal adopts multiple bandwidths for uplink transmission after accessing the network, power configuration parameters corresponding to all or part of first bandwidths in the n bandwidths need to be adjusted due to a change in at least one factor of the service, the coverage, the power consumption, the antenna configuration, or the like.

When the first bandwidth is all of the n bandwidths, the base station adjusts the first duty cycle and/or first power value corresponding to the first bandwidth according to an adjustment requirement, and recalculates the equivalent power value corresponding to the first bandwidth according to the adjusted first duty cycle and/or first power value corresponding to the first bandwidth.

When the first bandwidth is part of the n bandwidths, the base station further needs to acquire an equivalent power value corresponding to a second bandwidth, except the first bandwidth, in the n bandwidths.

In a possible implementation mode, the base station acquires a second duty cycle and second power value corresponding to the second bandwidth, except the first bandwidth, in the n bandwidths, and the base station calculates the equivalent power value corresponding to the second bandwidth according to the second duty cycle and the second power value. For example, the base station reads the historically cached second duty cycle and second power value corresponding to the second bandwidth, or, the base station receives the second duty cycle and second power value, from the terminal, corresponding to the second bandwidth. The second power value refers to practical power of the terminal during uplink transmission on the second bandwidth.

In another possible implementation mode, the base station acquires an equivalent power value corresponding to a second bandwidth, except the first bandwidth, in the n bandwidths. For example, the base station reads the historically cached equivalent power value corresponding to the second bandwidth, or, the base station receives the equivalent power value, from the terminal, corresponding to the second bandwidth.

After acquiring the equivalent power value corresponding to the first bandwidth and the equivalent power value corresponding to the second bandwidth, the base station calculates the overall equivalent power value of the terminal according to formula 2 or formula 3 to further determine whether the overall equivalent power value is higher than the configuration upper limit.

It is also to be noted that, in the embodiment illustrated in FIG. 4, the base station may further decrease the second duty cycle and/or second power value corresponding to the second bandwidth, besides regenerating the configuration information of the first bandwidth, when the overall equivalent power value is higher than the configuration upper limit. For example, the terminal simultaneously uses totally three bandwidths, i.e., bandwidth A, bandwidth B, and bandwidth C, for uplink transmission, and when a power configuration parameter corresponding to bandwidth A needs to be increased as required by a service, the base station may decrease a power configuration parameter corresponding to at least one of bandwidth B or bandwidth C if the overall equivalent power value after adjustment is higher than the configuration upper limit.

The base station calculates the equivalent power value corresponding to the second bandwidth according to the decreased second duty cycle and second power value corresponding to the second bandwidth, and calculates the overall equivalent power value according to the equivalent power value corresponding to the first bandwidth and the equivalent power value corresponding to the second bandwidth.

It is to be noted that the decreased power configuration parameter of the second bandwidth is changed, so that the decreased second bandwidth also becomes a first bandwidth which presently needs to be configured.

It is also to be noted that the second bandwidth may be decreased for many times until the overall equivalent power value of the terminal is not higher than the configuration upper limit.

Figure 5:
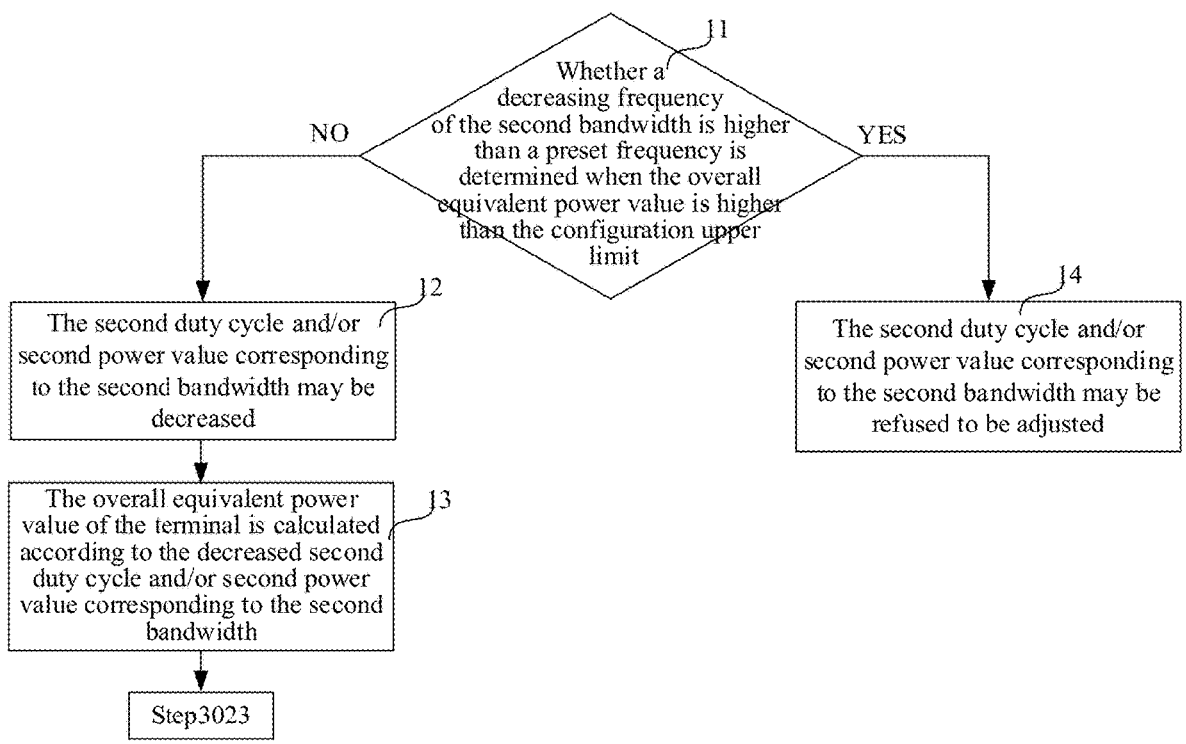
FIG. 5 is a flowchart showing a power configuration method for multi-bandwidth transmission, according to another exemplary embodiment.

In an optional embodiment based on FIG. 4, a preset frequency is also stored in the base station because the second bandwidth may not be decreased for unlimited times. The preset frequency is used to avoid the second bandwidth being ineffectively decreased for many times. As illustrated in FIG. 5, the base station determines to continue or refuse to adjust the second bandwidth according to the preset frequency through the following steps.

In step 11, whether a decreasing frequency is higher than a preset frequency is determined.

The preset frequency is stored in the base station. The preset frequency is configured to indicate a frequency upper limit of adjustment of the second duty cycle and/or second power value corresponding to the second bandwidth by the base station.

The base station determines whether the decreasing frequency of the second bandwidth is higher than the preset frequency when the power configuration parameter corresponding to the second bandwidth needs to be decreased.

Step 14 is executed when the decreasing frequency is higher than the preset frequency; otherwise, step 12 is executed.

In step 12, the second duty cycle and/or second power value corresponding to the second bandwidth may be decreased.

In some embodiments, the base station decreases the second duty cycle of the terminal during uplink transmission on the second bandwidth.

In some embodiments, the base station decreases the second power value of the terminal during uplink transmission on the second bandwidth.

In some embodiments, the base station simultaneously decreases the second duty cycle and second power value of the terminal during uplink transmission on the second bandwidth.

In step 13, the overall equivalent power value of the terminal is calculated according to the decreased second duty cycle and/or second power value corresponding to the second bandwidth.

The base station re-executes step 3023 after recalculating the overall equivalent power value of the terminal.

In step 14, the base station refuses to adjust the second duty cycle and/or second power value corresponding to the second bandwidth.

Optionally, the base station may cancel present configuration when the decreasing frequency of the second bandwidth has reached the preset frequency.

In summary, according to the method provided in the embodiment, the second duty cycle and/or second power value corresponding to the second bandwidth may be decreased to ensure that the overall equivalent power value of the terminal is not higher than the configuration upper limit under the condition of ensuring normal configuration of the first bandwidth, to avoid the SAR exceeding the standard in some time windows.

In addition, according to the method provided in the embodiment, the upper limit of the decreasing frequency is limited to control time required by configuration of the base station and ensure that the terminal may timely acquire the configuration information of the base station, thereby meeting a delay requirement during uplink transmission of the terminal.

In an optional embodiment of the embodiment illustrated in FIG. 4, since service priorities of all or part of second bandwidths may be increased when the base station generates the configuration information of the first bandwidth, namely a service priority of a second bandwidth is higher than a service priority of the first bandwidth, the second bandwidth with the lower service priority is preferentially selected to be decreased when the power configuration parameter corresponding to the second bandwidth needs to be decreased. In some embodiments, for example, if the service priorities of all the second bandwidths are higher than the service priority of the first bandwidth, the following adjustment manner may also be adopted.

The base station decreases the first duty cycle and/or first equivalent power value corresponding to the first bandwidth when the overall equivalent power value is higher than the configuration upper limit and a service priority of the second bandwidth is higher than a service priority of the first bandwidth. The base station recalculates the overall equivalent power value according to the decreased first duty cycle and/or first equivalent power value corresponding to the first bandwidth, and generates the configuration information of the first bandwidth according to the first duty cycle and/or first power value corresponding to the first bandwidth when the overall equivalent power value is not higher than the configuration upper limit.

Figure 6:
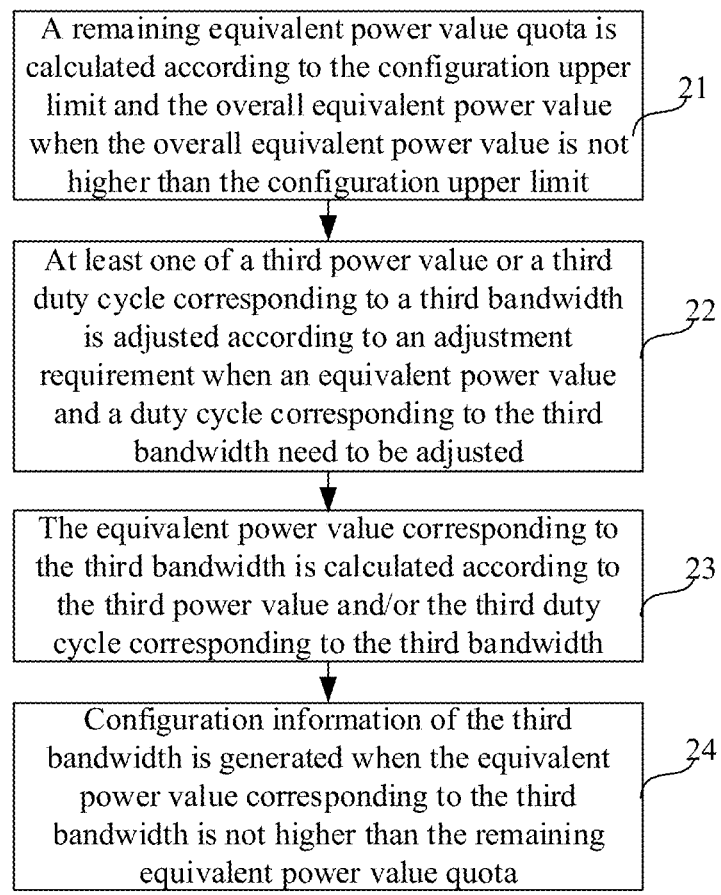
FIG. 6 is a flowchart showing a power configuration method for multi-bandwidth transmission, according to another exemplary embodiment.

In the above-mentioned embodiments, the overall equivalent power value of the terminal is adopted for calculation when whether the SAR of the terminal exceeds the standard is determined. In some optional embodiments, the base station may calculate a remaining equivalent power value quota after completing calculating the overall equivalent power value for the first time, and only needs to calculate whether an incremental power value in present adjustment is higher than the remaining equivalent power value when subsequently required to determine whether the SAR of the terminal exceeds the standard. Referring to FIG. 6, the process may include the following steps.

In step 21, a remaining equivalent power value quota is calculated according to the configuration upper limit and the overall equivalent power value when the overall equivalent power value is not higher than the configuration upper limit.

The remaining equivalent power value quota is equal to the configuration upper limit minus the overall equivalent power value of the terminal. That is, the base station subtracts the overall equivalent power value from the configuration upper limit to acquire the remaining equivalent power value quota when the overall equivalent power value is not higher than the configuration upper limit.

In step 22, at least one of a third duty cycle or third power value corresponding to a third bandwidth is adjusted according to an adjustment requirement when the third duty cycle and third power value corresponding to the third bandwidth need to be adjusted.

Optionally, the adjustment requirement includes at least one of the service, the coverage, the power consumption, or the antenna configuration. The base station adjusts the third duty cycle and/or third power value corresponding to the third bandwidth according to at least one of the adjustment requirements. The third power value refers to practical power of the terminal during uplink transmission on the third bandwidth.

The third duty cycle and/or third power value corresponding to the third bandwidth may be increased or decreased when adjusted.

In step 23, an increment of the equivalent power value corresponding to the third bandwidth is calculated according to the third duty cycle and/or third power value corresponding to the third bandwidth.

The increment is equal to the equivalent power value corresponding to the third bandwidth after present adjustment minus the equivalent power value corresponding to the third bandwidth before present adjustment.

In step 24, configuration information of the third bandwidth is generated when the increment of the equivalent power value corresponding to the third bandwidth is not higher than the remaining equivalent power value quota.

It is to be noted that a time sequence of calculation of the remaining equivalent power value quota and calculation of the increment is not limited. The two calculations may be performed concurrently. Alternatively, the calculation of the remaining equivalent power value quota may be followed by the calculation of the increment of the equivalent power value corresponding to the third bandwidth. Alternatively, the calculation of the increment of the equivalent power value corresponding to the third bandwidth may be followed by the calculation of the remaining equivalent power value quota.

In summary, according to the method provided in the embodiment, the base station calculates and compares the increment of the equivalent power value corresponding to the third bandwidth and the remaining equivalent power value quota to determine whether the SAR value of the terminal exceeds the standard, and does not need to recalculate the overall equivalent power value, so that the calculation is simplified, and the calculation burden of the base station is reduced.

A manner for acquiring the "configuration upper limit of the overall equivalent power value" in step 301 will be introduced below. Any one of the following three implementation modes may be adopted for step 301.

In the first mode, the base station receives the configuration upper limit, from the terminal, of the overall equivalent power value. The configuration upper limit is calculated by the terminal according to a configuration upper limit of the equivalent power value corresponding to each bandwidth.

In the second mode, the base station receives a sub configuration upper limit, from the terminal, of the equivalent power value corresponding to each bandwidth, and the base station determines the configuration upper limit of the overall equivalent power value of the terminal according to the sub configuration upper limits.

In the third mode, the base station receives a first sub configuration upper limit, from the terminal, corresponding to each bandwidth during independent work under a specified duty cycle, and determines the configuration upper limit of the overall equivalent power value of the terminal according to the first sub configuration upper limits.

Figure 7:
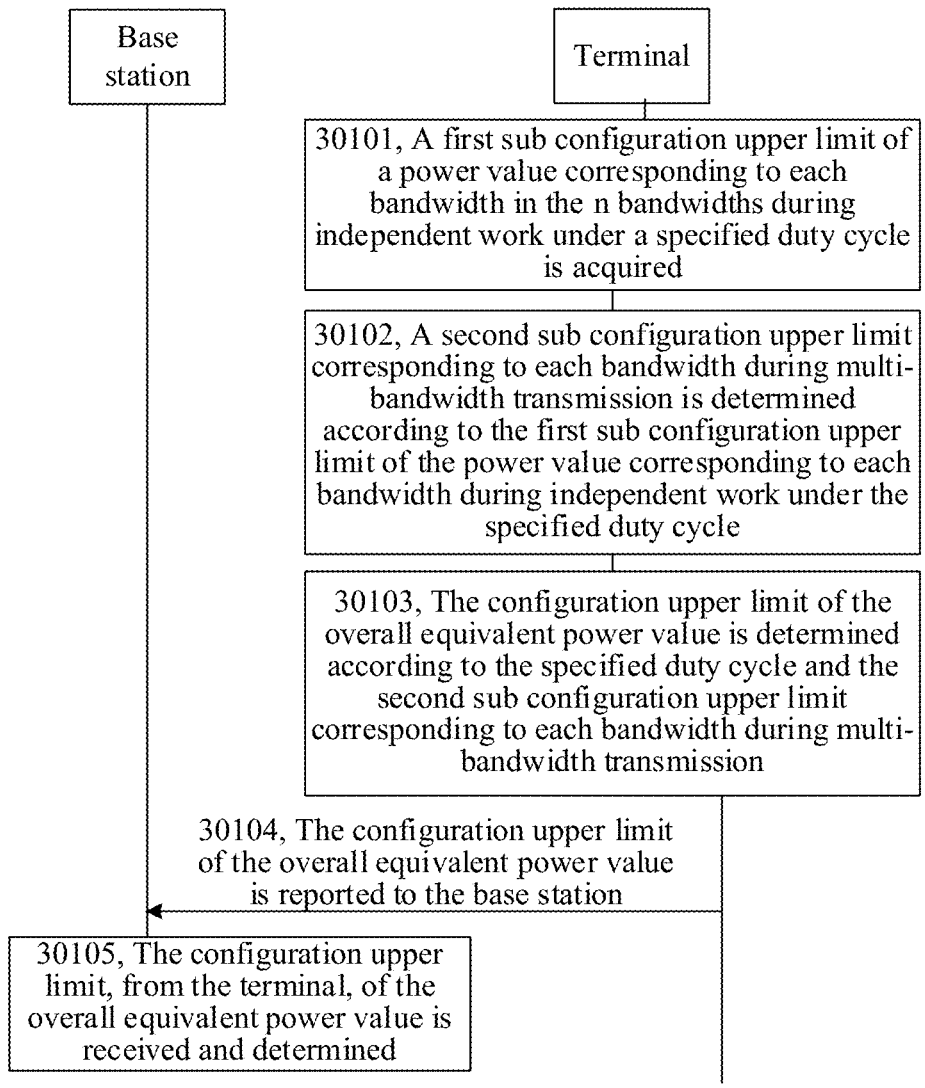
FIG. 7 is a flowchart showing a power configuration method for multi-bandwidth transmission, according to another exemplary embodiment.

In the first implementation mode, as illustrated in FIG. 7, the terminal calculates the configuration upper limit of the overall equivalent power value, and then the terminal reports the configuration upper limit of the overall equivalent power value to the base station. The process may include the following steps.

In step 30101, the terminal acquires a first sub configuration upper limit of a power value corresponding to each bandwidth in the n bandwidths during independent work under a specified duty cycle.

In step 30102, the terminal determines a second sub configuration upper limit corresponding to each bandwidth during multi-bandwidth transmission according to the first sub configuration upper limit of the power value corresponding to each bandwidth during independent work under the specified duty cycle.

The second sub configuration upper limit is lower than the first sub configuration upper limit. That is, the second sub configuration upper limit needs to be regressed to a certain extent relative to the first sub configuration upper limit.

In an optional embodiment, the terminal calculates an average value of the first sub configuration upper limits of equivalent power values corresponding to the n bandwidths during independent work under corresponding duty cycles, and determines a quotient of the average value and n as the second sub configuration upper limit corresponding to each bandwidth during multi-bandwidth transmission.

For example, first sub configuration upper limits corresponding to bandwidth A, bandwidth B, and bandwidth C are all 90. In such case, a quotient 30 of 90 and 3 is determined as a second sub configuration upper limit corresponding to each bandwidth during multi-bandwidth transmission.

In an optional embodiment, the terminal calculates a maximum value of the first sub configuration upper limits of equivalent power values corresponding to the n bandwidths during independent work under corresponding duty cycles, and determines a quotient of the maximum value and n as the second sub configuration upper limit corresponding to each bandwidth during multi-bandwidth transmission.

For example, a first sub configuration upper limit corresponding to bandwidth D is 80%, a first sub configuration upper limit corresponding to bandwidth E is 90%, and a first sub configuration upper limit corresponding to bandwidth F is 60%. The first sub configuration upper limit corresponding to bandwidth E in the three bandwidths is maximum. In such case, a quotient 30% of 90% and 3 is determined as a second sub configuration upper limit corresponding to each bandwidth during multi-bandwidth transmission.

In an optional embodiment, the terminal calculates a minimum value of the first sub configuration upper limits of equivalent power values corresponding to the n bandwidths during independent work under corresponding duty cycles, and determines a quotient of the minimum value and n as the second sub configuration upper limit corresponding to each bandwidth during multi-bandwidth transmission.

For example, a first sub configuration upper limit corresponding to bandwidth D is 80%, a first sub configuration upper limit corresponding to bandwidth E is 90%, and a first sub configuration upper limit corresponding to bandwidth F is 60%. The first sub configuration upper limit corresponding to bandwidth F in the three bandwidths is minimum. In such case, a quotient 20% of 60% and 3 is determined as a second sub configuration upper limit corresponding to each bandwidth during multi-bandwidth transmission.

In an optional embodiment, the terminal calculates an average value of the first sub configuration upper limits of equivalent power values corresponding to the n bandwidths during independent work under corresponding duty cycles, and determines n divided values acquired by dividing the average value according to n weights as the second sub configuration upper limits corresponding to the n bandwidths during multi-bandwidth transmission, the n weights corresponding to the n bandwidths one to one, and a sum of the n weights being 1.

For example, first sub configuration upper limits corresponding to bandwidth M and bandwidth N are both 80%, and weights of the two bandwidths are both 0.5. In such case, 80% is divided according to the weight, and second sub configuration upper limits corresponding to bandwidth M and bandwidth N during multi-bandwidth transmission are both 40%.

Magnitudes of the n weights may be set according to at least one factor of service priorities, power consumption, coverage, antenna configurations, or the like, on each bandwidth.

In an optional embodiment, the terminal calculates a maximum value of the first sub configuration upper limits of equivalent power values corresponding to the n bandwidths during independent work under corresponding duty cycles, and determines n divided values acquired by dividing the maximum value according to n weights as the second sub configuration upper limits corresponding to the n bandwidths during multi-bandwidth transmission, the n weights corresponding to the n bandwidths one to one, and a sum of the n weights being 1.

For example, a first sub configuration upper limit corresponding to bandwidth Q is 50%, a first sub configuration upper limit corresponding to bandwidth U is 70%, a first sub configuration upper limit corresponding to bandwidth V is 90%, a weight of bandwidth Q is 0.3, a weight of bandwidth U is 0.5, and a weight of bandwidth V is 0.2. The first sub configuration upper limit corresponding to bandwidth V is maximum. In such case, a second sub configuration upper limit corresponding to bandwidth Q during multi-bandwidth transmission is 27%, a second sub configuration upper limit corresponding to bandwidth U during multi-bandwidth transmission is 45%, and a second sub configuration upper limit corresponding to bandwidth V during multi-bandwidth transmission is 18%.

In an optional embodiment, the terminal calculates a minimum value of the first sub configuration upper limits of equivalent power values corresponding to the n bandwidths during independent work under corresponding duty cycles, and determines n divided values acquired by dividing the minimum value according to n weights as the second sub configuration upper limits corresponding to the n bandwidths during multi-bandwidth transmission, the n weights corresponding to the n bandwidths one to one, and a sum of the n weights being 1.

For example, a first sub configuration upper limit corresponding to bandwidth Q is 50%, a first sub configuration upper limit corresponding to bandwidth U is 70%, a first sub configuration upper limit corresponding to bandwidth V is 90%, a weight of bandwidth Q is 0.3, a weight of bandwidth U is 0.5, and a weight of bandwidth V is 0.2. The first sub configuration upper limit corresponding to bandwidth Q is minimum. In such case, a second sub configuration upper limit corresponding to bandwidth Q during multi-bandwidth transmission is 15%, a second sub configuration upper limit corresponding to bandwidth U during multi-bandwidth transmission is 25%, and a second sub configuration upper limit corresponding to bandwidth V during multi-bandwidth transmission is 10%.

In step 30103, the terminal determines the configuration upper limit of the overall equivalent power value according to the second sub configuration upper limit and the specified duty cycle corresponding to each bandwidth during multi-bandwidth transmission.

When the overall equivalent power value is calculated using formula 2, for each bandwidth in the n bandwidths, the terminal multiplies the second sub configuration upper limit, the specified duty cycle $DC_{as\_j}$, and an evaluation time window corresponding to the bandwidth during multi-bandwidth transmission based on a similar calculation principle to acquire a third product corresponding to the bandwidth. The third products corresponding to the n bandwidths are accumulated to acquire the configuration upper limit of the overall equivalent power value.

When the overall equivalent power value is calculated using formula 3, for each bandwidth in the n bandwidths, the second sub configuration upper limit and the specified duty cycle $DC_{as\_j}$ corresponding to the bandwidth during multi-bandwidth transmission are multiplied based on a similar calculation principle to acquire a fourth product corresponding to the bandwidth. The fourth products corresponding to the n bandwidths are accumulated to acquire the configuration upper limit of the overall equivalent power value.

In step 30104, the terminal reports the configuration upper limit of the overall equivalent power value to the base station.

In step 30105, the base station receives and stores the configuration upper limit, from the terminal, of the overall equivalent power value.

Figure 8:
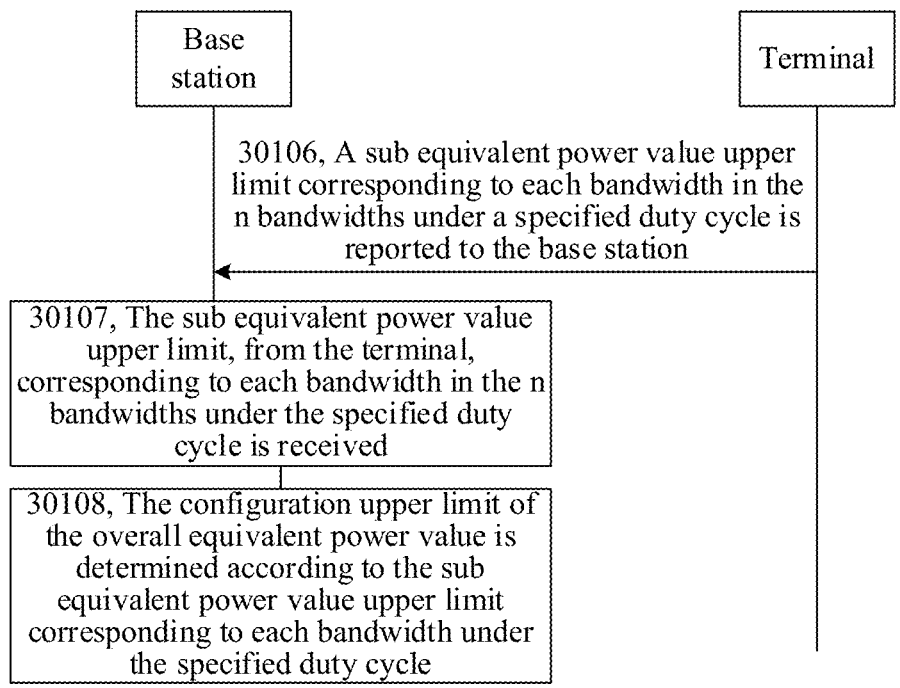
FIG. 8 is a flowchart showing a power configuration method for multi-bandwidth transmission, according to another exemplary embodiment.

In the second implementation mode, as illustrated in FIG. 8, the terminal calculates and reports the second sub configuration upper limits to the base station, and then the base station calculates the configuration upper limit of the overall equivalent power value. The process may include the following steps.

In step 30106, the terminal reports a second sub configuration upper limit corresponding to each bandwidth in the n bandwidths under a specified duty cycle to the base station.

A calculation manner for the second sub configuration upper limit may refer to the manner in step 30102.

In step 30107, the base station receives the second sub configuration upper limit, from the terminal, corresponding to each bandwidth in the n bandwidths under the specified duty cycle.

In step 30108, the base station determines the configuration upper limit of the overall equivalent power value according to the second sub configuration upper limit corresponding to each bandwidth under the specified duty cycle.

The base station calculates the configuration upper limit of the overall equivalent power value according to formula 2 or formula 3. A calculation process refers to step 30103, and will not be elaborated here.

Figure 9:
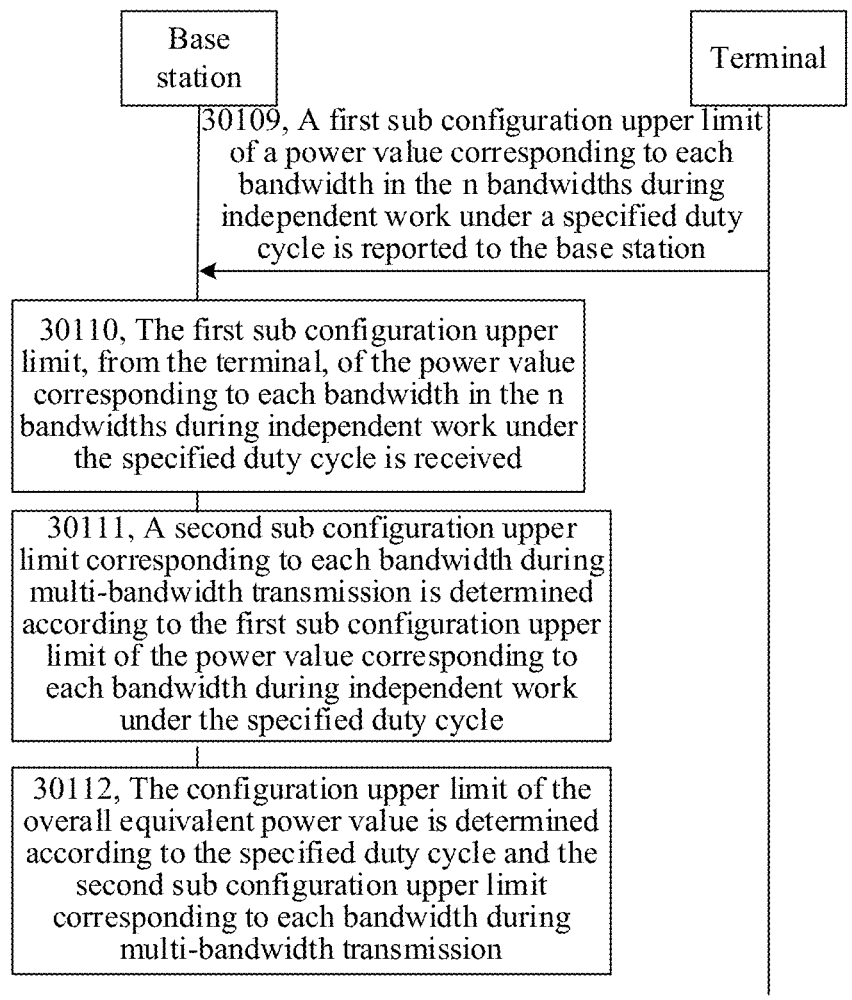
FIG. 9 is a flowchart showing a power configuration method for multi-bandwidth transmission, according to another exemplary embodiment.

In the third implementation mode, as illustrated in FIG. 9, the base station calculates the configuration upper limit of the overall equivalent power value. The process may include the following steps.

In step 30109, the terminal reports a first sub configuration upper limit of a power value corresponding to each bandwidth in the n bandwidths during independent work under a specified duty cycle to the base station.

In step 30110, the base station receives the first sub configuration upper limit, from the terminal, of the power value corresponding to each bandwidth in the n bandwidths during independent work under the specified duty cycle.

In step 30111, the base station determines a second sub configuration upper limit corresponding to each bandwidth during multi-bandwidth transmission according to the first sub configuration upper limit of the power value corresponding to each bandwidth during independent work under the specified duty cycle.

The second sub configuration upper limit is lower than the first sub configuration upper limit.

In an optional embodiment, the base station calculates an average value of the first sub configuration upper limits of equivalent power values corresponding to the n bandwidths during independent work under corresponding PCs, and determines a quotient of the average value and n as the second sub configuration upper limit corresponding to each bandwidth during multi-bandwidth transmission.

In some other optional embodiments, the base station calculates a maximum value of the first sub configuration upper limits of equivalent power values corresponding to the n bandwidths during independent work under corresponding PCs, and determines a quotient of the maximum value and n as the second sub configuration upper limit corresponding to each bandwidth during multi-bandwidth transmission.

In some other optional embodiments, the base station calculates a minimum value of the first sub configuration upper limits of equivalent power values corresponding to the n bandwidths during independent work under corresponding PCs, and determines a quotient of the minimum value and n as the second sub configuration upper limit corresponding to each bandwidth during multi-bandwidth transmission.

In some other optional embodiments, the base station calculates an average value of the first sub configuration upper limits of equivalent power values corresponding to the n bandwidths during independent work under corresponding PCs, and determines n divided values acquired by dividing the average value according to n weights as the second sub configuration upper limits corresponding to the n bandwidths during multi-bandwidth transmission, the n weights corresponding to the n bandwidths one to one, and a sum of the n weights being 1.

In some other optional embodiments, the base station calculates a maximum value of the first sub configuration upper limits of equivalent power values corresponding to the n bandwidths during independent work under corresponding PCs, and determines n divided values acquired by dividing the maximum value according to n weights as the second sub configuration upper limits corresponding to the n bandwidths during multi-bandwidth transmission, the n weights corresponding to the n bandwidths one to one, and a sum of the n weights being 1.

In some other optional embodiments, the base station calculates a minimum value of the first sub configuration upper limits of equivalent power values corresponding to the n bandwidths during independent work under corresponding PCs, and determines n divided values acquired by dividing the minimum value according to n weights as the second sub configuration upper limits corresponding to the n bandwidths during multi-bandwidth transmission, the n weights corresponding to the n bandwidths one to one, and a sum of the n weights being 1.

In step 30112, the base station determines the configuration upper limit of the overall equivalent power value according to the second sub configuration upper limit and the specified duty cycle corresponding to each bandwidth during multi-bandwidth transmission.

When the overall equivalent power value is calculated using formula 2, for each bandwidth in the n bandwidths, the base station multiplies the second sub configuration upper limit, the specified duty cycle $DC_{as\_j}$, and an evaluation time window corresponding to the bandwidth during multi-bandwidth transmission based on a similar calculation principle to acquire a third product corresponding to the bandwidth. The third products corresponding to the n bandwidths are accumulated to acquire the configuration upper limit of the overall equivalent power value.

When the overall equivalent power value is calculated using formula 3, for each bandwidth in the n bandwidths, the base station multiplies the second sub configuration upper limit and the specified duty cycle $DC_{as\_j}$ corresponding to the bandwidth during multi-bandwidth transmission based on a similar calculation principle to acquire a fourth product corresponding to the bandwidth. The fourth products corresponding to the n bandwidths are accumulated to acquire the configuration upper limit of the overall equivalent power value.

It is also to be noted that the equivalent power value corresponding to the single bandwidth may also be calculated according to an equivalent duty cycle corresponding to the single bandwidth. The overall equivalent power value of the terminal may also be calculated according to an overall equivalent duty cycle of the terminal.

The equivalent duty cycle corresponding to the single bandwidth is a numerical value configured to equivalently measure a duty cycle of the terminal on the single bandwidth during uplink transmission. The numerical value may be used as a criterion of determining whether a SAR exceeds the standard on the single bandwidth.

In a calculation manner for the equivalent duty cycle corresponding to the single bandwidth, the single bandwidth is, for example, a jth bandwidth, a whole evaluation time window includes n sub time windows, and the terminal correspondingly uses n duty cycles and n PCs in the n sub time windows on the jth bandwidth respectively. A PC corresponds to a piece of uplink transmit power. For example, power of PC2 is 26 dBm (i.e., decibels relative to one milliwatt), and power of PC3 is 23 dBm.

For the jth bandwidth in the n bandwidths, an equivalent duty cycle corresponding to the jth bandwidth is equal to:

$$DC_{eq\_Band\_j}=(DC_{p1}\times P_1\times T_1+DC_{p2}\times P_2\times T_2+DC_{p3}\times P_3\times T_3+\ldots+DC_{pi}\times P_i\times T_i+\ldots+DC_{pn}\times P_n\times T_n)/(P_{as\_j}\times T_{window})$$

Formula 4, where $DC_{eq\_Band\_i}$ is the equivalent duty cycle corresponding to the jth bandwidth under a specified PC, $P_{as\_j}$ is transmit power of the specified PC corresponding to the jth bandwidth, $T_{window}$ is the whole evaluation time window, $DC_{pi}$ is a practical duty cycle in an ith sub evaluation time period, $P_i$ is power corresponding to a practical PC in the ith sub evaluation time period, and $T_i$ is the ith sub evaluation time period. Each sub evaluation time period is non-overlapping, and i is an integer not greater than n. A practical PC in each sub evaluation time period may be the same or different.

Optionally, a specified PC corresponding to a single bandwidth is configured by the base station or determined according to a predefinition manner. Each bandwidth corresponds to the same or different specified PC. For example, for the jth bandwidth, any one of practical PCs used by the terminal on the jth bandwidth may be determined as the specified PC, or a minimum class in the practical PCs used by the terminal on the jth bandwidth is determined as the specified PC, or a maximum class in the practical PCs used by the terminal on the jth bandwidth is determined as the specified PC, or a predefined PC is determined as the specified PC.

The overall equivalent duty cycle is a numerical value configured to equivalently measure duty cycle of the whole terminal during multi-bandwidth transmission on the n bandwidths. Optionally, the overall equivalent duty cycle is calculated based on an equivalent duty cycle of the terminal corresponding to each bandwidth in the n bandwidths. The numerical value may be used as a criterion of determining whether the SAR of the whole terminal exceeds the standard in the multi-bandwidth transmission scene.

In a first calculation manner for the overall equivalent duty cycle, for each bandwidth in the n bandwidths, the equivalent duty cycle, the specified power value, and an evaluation time window corresponding to the bandwidth are multiplied to acquire a first product corresponding to the bandwidth, and the first products corresponding to the n bandwidths respectively are accumulated to acquire the overall equivalent duty cycle, namely:

$$DC_{eq}=(DC_{eq\_Band\_1} \times P_{as\_1} \times T_{window} + DC_{eq\_Band\_2} \times P_{as\_2} \times T_{window} + DC_{eq\_Band\_3} \times P_{as\_3} \times T_{window} + \ldots + DC_{eq\_Band\_j} \times P_{as\_j} \times T_{window} + \ldots DC_{eq\_Band\_n} \times P_{as\_n} \times T_{window})/(P_{as} \times T_{window})$$ Formula 5, where $DC_{eq}$ is the overall equivalent duty cycle of the terminal, $P_{as}$ is a specified power value corresponding to the whole terminal, the specified power value corresponding to the specified PC, $DC_{eq\_Band\_j}$ is an equivalent duty cycle corresponding to the jth bandwidth under a specified power value $P_{as\_j}$, $P_{as\_j}$ is the specified power value corresponding to the jth bandwidth, $T_{window}$ is a whole evaluation time window, and $DC_{eq\_Band\_j} \times P_{as\_j} \times T_{window}$ represents the first product.

In a second calculation manner for the overall equivalent duty cycle, for each bandwidth in the n bandwidths, the equivalent duty cycle and specified power value corresponding to the bandwidth are multiplied to acquire a second product corresponding to the bandwidth, and the second products corresponding to the n bandwidths respectively are accumulated to acquire the overall equivalent duty cycle, namely:

$$DC_{eq}=(DC_{eq\_Band\_1} \times P_{as\_1} + DC_{eq\_Band\_2} \times P_{as\_2} + DC_{eq\_Band\_3} \times P_{as\_3} + \ldots + DC_{eq\_Band\_j} \times P_{as\_j} + \ldots DC_{eq\_Band\_n} \times P_{as\_n})/P_{as}$$ Formula 6 where $DC_{eq}$ is the overall equivalent duty cycle of the terminal, $P_{as}$ is a specified power value corresponding to the whole terminal, the specified power value corresponding to the specified PC, $DC_{eq\_Band\_j}$ is an equivalent duty cycle corresponding to the jth bandwidth under a specified power value $P_{as\_j}$, $P_{as\_j}$ is the specified power value corresponding to the jth bandwidth, and $DC_{eq\_Band\_j} \times P_{as\_j}$ represents the second product.

A formula for conversion between the overall equivalent power value and the overall equivalent duty cycle is as follows:

$$DC_{eq} \times P_{as} = P_{eq} \times DC_{as}$$ Formula 7.

That is, the specified power value $P_{as}$ and the specified duty cycle ($DC_{as}$) are determined, and the overall equivalent duty cycle ($DC_{eq}$) and the overall equivalent power value ($P_{eq}$) may correspond to each other.

A formula for conversion between an equivalent power value corresponding to a single bandwidth and an equivalent power value corresponding to the single value is as follows:

$$DC_{eq\_Band\_j} \times P_{as\_j} = P_{eq\_Band\_j} \times DC_{as\_j}$$ Formula 8.

A conversion principle of formula 8 is the same as a conversion principle of formula 7. The specified power value $P_{as\_j}$ and specified duty cycle $DC_{as\_j}$ corresponding to the jth bandwidth in the n bandwidths are determined, and the equivalent duty cycle $DC_{eq\_Band\_j}$ and equivalent power value $P_{eq\_Band\_j}$ corresponding to the jth bandwidth may correspond to each other.

Therefore, the base station or the terminal may calculate an equivalent duty cycle corresponding to a single bandwidth through formula 4 and then acquire an equivalent power value corresponding to the single bandwidth by conversion through formula 7.

The base station or the terminal may directly calculate the overall equivalent duty cycle of the terminal through formula 4, formula 5, or formula 6 and then acquire the overall equivalent power value of the terminal by conversion through formula 8.

The base station or the terminal may calculate an equivalent duty cycle corresponding to a single bandwidth through formula 4 and then acquire an equivalent power value corresponding to the single bandwidth by conversion through formula 7. Then, the base station or the terminal calculates the overall equivalent duty cycle of the terminal through formula 5 or formula 6.

The apparatus embodiments of the present disclosure are set forth hereinafter, and may be configured to execute the method embodiments of the present disclosure. The details not disclosed in the apparatus embodiments of the present disclosure may refer to the method embodiments of the present disclosure.

Figure 10:
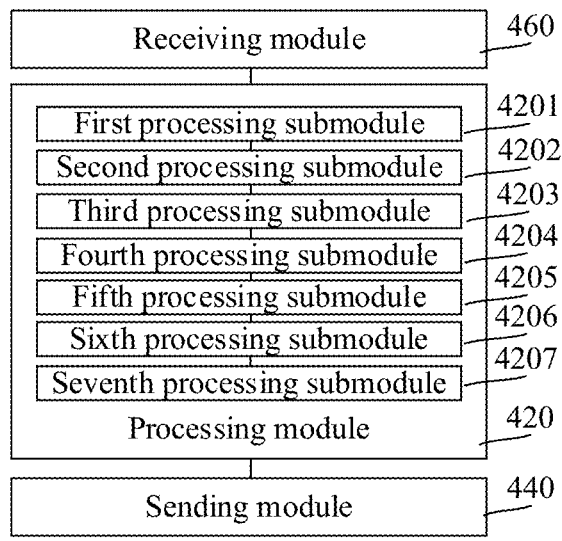
FIG. 10 is a block diagram of a power configuration apparatus for multi-bandwidth transmission, according to an exemplary embodiment.

FIG. 10 is a block diagram of a power configuration apparatus for multi-bandwidth transmission, according to another exemplary embodiment of the present disclosure. The apparatus may be implemented as all or part of an access network device by software, hardware, or a combination thereof. The apparatus includes a processing module 420 and a sending module 440.

The processing module 420 is configured to determine a configuration upper limit of an overall equivalent power value of a terminal during multi-bandwidth transmission on n bandwidths, n being an integer greater than 1.

The processing module 420 is configured to generate configuration information of a first bandwidth in the n bandwidths for the terminal, the overall equivalent power value corresponding to the configuration information on the n bandwidths being not higher than the configuration upper limit.

The sending module 440 is configured to send the configuration information to the terminal, the configuration information being configured to configure a power configuration parameter for uplink sending of the terminal on the first bandwidth.

In some embodiments, the processing module 420 includes:

a first processing submodule 4201, configured to acquire an equivalent power value of the terminal corresponding to each bandwidth in the n bandwidths, the n bandwidths comprising the first bandwidth that is presently configured;

a second processing submodule 4202, configured to calculate the overall equivalent power value of the terminal according to the equivalent power value and a specified duty cycle of the terminal corresponding to each bandwidth; and a third processing submodule 4203, configured to generate the configuration information of the first bandwidth when the overall equivalent power value is not higher than the configuration upper limit, the configuration information of the first bandwidth being configured to configure a first power value and/or a first duty cycle of the terminal on the first bandwidth.

In some embodiments, the second processing submodule 4202 is configured to, for each bandwidth in the n bandwidths, multiply the equivalent power value, the specified duty cycle, and an evaluation time window corresponding to the bandwidth to acquire a first product corresponding to the bandwidth, and accumulate the first products corresponding to the n bandwidths respectively to acquire the overall equivalent power value; or, for each bandwidth in the n bandwidths, multiply the equivalent power value and the specified duty cycle corresponding to the bandwidth to acquire a second product corresponding to the bandwidth, and accumulate the second products corresponding to the n bandwidths respectively to acquire the overall equivalent power value.

In some embodiments, for a jth bandwidth in the n bandwidths, an equivalent power value corresponding to the jth bandwidth is equal to:

$$P_{eq\_Band\_j} = (DC_{p1} \times P_1 \times T_1 + DC_{p2} \times P_2 \times T_2 + DC_{p3} \times P_3 \times T_3 + \ldots + DC_{p1} \times P_1 \times T_i + \ldots DC_{pn} \times P_n \times T_n) / (DC_{as\_j} \times T_{window}),$$

where $P_{eq\_Band\_j}$ is the equivalent power value corresponding to the jth bandwidth under the specified duty cycle, $DC_{as\_j}$ is the specified duty cycle corresponding to the jth bandwidth, $T_{window}$ is a whole evaluation time window, $DC_{pi}$ is a duty cycle in an ith sub evaluation time period, $P_i$ is power corresponding to a practical PC in the ith sub evaluation time period, and $T_i$ is the ith sub evaluation time period, each sub evaluation time period being non-overlapping.

In some embodiments, the first processing submodule 4201 is configured to calculate the equivalent power value corresponding to each bandwidth according to a default duty cycle and a preset power value corresponding to each bandwidth in the n bandwidths.

In some embodiments, the first processing submodule 4201 is configured to, when the first power value and the first duty cycle corresponding to the first bandwidth need to be adjusted, adjust at least one of the first power value or the first duty cycle corresponding to the first bandwidth according to an adjustment requirement, and calculate the equivalent power value corresponding to the first bandwidth according to the first power value and the first duty cycle.

The first processing submodule 4201 is configured to acquire a second power value and a second duty cycle corresponding to a second bandwidth, except the first bandwidth, in the n bandwidths and calculate the equivalent power value corresponding to the second bandwidth according to the second power value and the second duty cycle; or, acquire an equivalent power value corresponding to the second bandwidth, except the first bandwidth, in the n bandwidths.

In some embodiments, the processing module 420 includes: a fourth processing submodule 4204, configured to decrease the second power value and/or the second duty cycle corresponding to the second bandwidth when the overall equivalent power value is higher than the configuration upper limit.

In some embodiments, the processing module 420 includes: a fifth processing submodule 4205, configured to refuse to adjust the second power value and/or the second duty cycle corresponding to the second bandwidth when a decreasing frequency is higher than a preset frequency and the overall equivalent power value is still higher than the configuration upper limit.

In some embodiments, the processing module 420 includes: a sixth processing submodule 4206, configured to decrease the first equivalent power value and/or the first duty cycle corresponding to the first bandwidth when the overall equivalent power value is higher than the configuration upper limit and a service priority of the second bandwidth is higher than a service priority of the first bandwidth.

In some embodiments, the apparatus further includes: the processing module 420, configured to calculate a remaining equivalent power value quota according to the configuration upper limit and the overall equivalent power value when the overall equivalent power value is not higher than the configuration upper limit.

The processing module 420 is configured to adjust at least one of a third power value or a third duty cycle corresponding to a third bandwidth according to an adjustment requirement when an equivalent power value and a duty cycle corresponding to the third bandwidth need to be adjusted.

The processing module 420 is configured to calculate an increment of the equivalent power value corresponding to the third bandwidth according to the third power value and/or the third duty cycle corresponding to the third bandwidth.

The processing module 420 is configured to generate configuration information of the third bandwidth when the increment of the equivalent power value corresponding to the third bandwidth is not higher than the remaining equivalent power value quota, configuration information of uplink transmit power being configured to configure the third power value and/or the third duty cycle of the terminal on the third bandwidth.

In some embodiments, the apparatus further includes a receiving module 460.

The receiving module 460 is configured to receive the configuration upper limit of the overall equivalent power value from the terminal.

In some embodiments, the receiving module 460 is configured to receive a second sub configuration upper limit, from the terminal, corresponding to each bandwidth in the n bandwidths during multi-bandwidth transmission under a specified duty cycle.

The processing module 420 is configured to determine the configuration upper limit of the overall equivalent power value according to the second sub configuration upper limit corresponding to each bandwidth during multi-bandwidth transmission under the specified duty cycle.

In some embodiments, the processing module 420 is configured to multiply the second sub configuration upper limit, the specified duty cycle, and an evaluation time window corresponding to each bandwidth during multi-bandwidth transmission under the specified duty cycle to acquire a third product, and add the third products to determine the configuration upper limit of the overall equivalent power value. Alternatively, the processing module 420 is configured to acquire a fourth product according to the second sub configuration upper limit and the specified duty cycle corresponding to each bandwidth during multi-bandwidth transmission under the specified duty cycle, and add the fourth products to determine the configuration upper limit of the overall equivalent power value.

In some embodiments, the receiving module 460 is configured to receive a first sub configuration upper limit, from the terminal, corresponding to each bandwidth in the n bandwidths during independent work under a specified duty cycle.

The processing module 420 is configured to determine a second sub configuration upper limit corresponding to each bandwidth during multi-bandwidth transmission according to the first sub configuration upper limit corresponding to each bandwidth during independent work under the specified duty cycle, the second sub configuration upper limit being lower than the first sub configuration upper limit.

The processing module 420 is configured to determine the configuration upper limit of the overall equivalent power value according to the specified duty cycle and the second sub configuration upper limit corresponding to each bandwidth during multi-bandwidth transmission.

In some embodiments, the processing module 420 includes:
- a seventh processing submodule 4207, configured to calculate an average value of the first sub configuration upper limits of equivalent power values corresponding to the n bandwidths during independent work under corresponding PCs, and determine a quotient of the average value and n as the second sub configuration upper limit corresponding to each bandwidth during multi-bandwidth transmission; or
- a seventh processing submodule 4207, configured to calculate a maximum value of the first sub configuration upper limits of equivalent power values corresponding to the n bandwidths during independent work under corresponding PCs, and determine a quotient of the maximum value and n as the second sub configuration upper limit corresponding to each bandwidth during multi-bandwidth transmission; or
- a seventh processing submodule 4207, configured to calculate a minimum value of the first sub configuration upper limits of equivalent power values corresponding to the n bandwidths during independent work under corresponding PCs, and determine a quotient of the minimum value and n as the second sub configuration upper limit corresponding to each bandwidth during multi-bandwidth transmission; or
- a seventh processing submodule 4207, configured to calculate an average value of the first sub configuration upper limits of equivalent power values corresponding to the n bandwidths during independent work under corresponding PCs, and determine n divided values acquired by dividing the average value according to n weights as the second sub configuration upper limits corresponding to the n bandwidths during multi-bandwidth transmission, the n weights corresponding to the n bandwidths one to one, and a sum of the n weights being 1; or
- a seventh processing submodule 4207, configured to calculate a maximum value of the first sub configuration upper limits of equivalent power values corresponding to the n bandwidths during independent work under corresponding PCs, and determine n divided values acquired by dividing the maximum value according to n weights as the second sub configuration upper limits corresponding to the n bandwidths during multi-bandwidth transmission, the n weights corresponding to the n bandwidths one to one, and a sum of the n weights being 1; or
- a seventh processing submodule 4207, configured to calculate a minimum value of the first sub configuration upper limits of equivalent power values corresponding to the n bandwidths during independent work under corresponding PCs, and determine n divided values acquired by dividing the minimum value according to n weights as the second sub configuration upper limits corresponding to the n bandwidths during multi-bandwidth transmission, the n weights corresponding to the n bandwidths one to one, and a sum of the n weights being 1.

In summary, according to the power configuration apparatus for multi-bandwidth transmission in the embodiment, the configuration upper limit of the overall equivalent power value of the terminal during multi-bandwidth transmission on the n bandwidths is determined through the processing module, n being an integer greater than 1. The configuration information of the first bandwidth in the n bandwidths is generated for the terminal. The overall equivalent power value corresponding to the configuration information on the n bandwidths being not higher than the configuration upper limit, and the overall equivalent power value is calculated according to the equivalent power values of the terminal corresponding to the n bandwidths respectively. Then, the configuration information is sent to the terminal through the sending module. The configuration information is configured to configure the power configuration parameter for uplink sending of the terminal on the first bandwidth. When the terminal adopts multiple bandwidths for transmission, the apparatus adaptively configures a power value of the terminal to ensure that the overall equivalent power value on the n bandwidths allocated for the terminal to use is not higher than the configuration upper limit and avoid a corresponding SAR value exceeding the standard.

Figure 11:
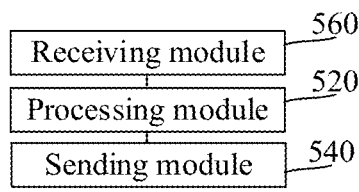
FIG. 11 is a block diagram of a power configuration apparatus for multi-bandwidth transmission, according to another exemplary embodiment.

FIG. 11 is a block diagram of a power configuration apparatus for multi-bandwidth transmission, according to another exemplary embodiment of the present disclosure. The apparatus may be implemented as all or part of a terminal by software, hardware, or a combination thereof. The apparatus includes a receiving module 560 and a processing module 520.

The receiving module 560 is configured to receive configuration information sent by a base station, an overall equivalent power value corresponding to the configuration information on n bandwidths for multi-band transmission being not higher than a configuration upper limit.

The processing module 520 is configured to determine a power configuration parameter for uplink sending on a first bandwidth according to the configuration information, the first bandwidth being one or more of the n bandwidths for multi-bandwidth transmission of the terminal, and an overall equivalent duty cycle on the n bandwidths being not higher than the configuration upper limit.

In some embodiments, the apparatus further includes:
- a sending module 540, configured to report the configuration upper limit of the overall equivalent power value to the base station; or
- a sending module 540, configured to report a second sub configuration upper limit corresponding to each bandwidth in the n bandwidths during multi-bandwidth transmission under a specified duty cycle to the base station; or
- a sending module 540, configured to report a first sub configuration upper limit of a power value corresponding to each bandwidth in the n bandwidths during independent work under a specified duty cycle to the base station.

In some embodiments, the apparatus further includes: the processing module 520, configured to calculate the second sub configuration upper limit corresponding to each bandwidth in the n bandwidths under the specified duty cycle according to a sub power value upper limit corresponding to a jth bandwidth in the n bandwidths in an ith sub evaluation time period, a corresponding duty cycle, and the corresponding ith sub evaluation time period.

In summary, according to the power configuration apparatus for multi-bandwidth transmission in the embodiment, the configuration information sent by the base station is received through the receiving module. The overall equivalent power value corresponding to the configuration information on the n bandwidths for multi-bandwidth transmission is not higher than the configuration upper limit, and the overall equivalent power value is calculated according to the equivalent power values of the terminal corresponding to the n bandwidths respectively. Then, the power configuration parameter for uplink sending on the first bandwidth is determined through the processing module according to the configuration information. When the terminal adopts multiple bandwidths for transmission, the apparatus adaptively configures a power value of the terminal according to the configuration information sent by the base station to ensure that the overall equivalent power value on the n bandwidths allocated for the terminal to use is not higher than the configuration upper limit and avoid a corresponding SAR value exceeding the standard.

Figure 12:
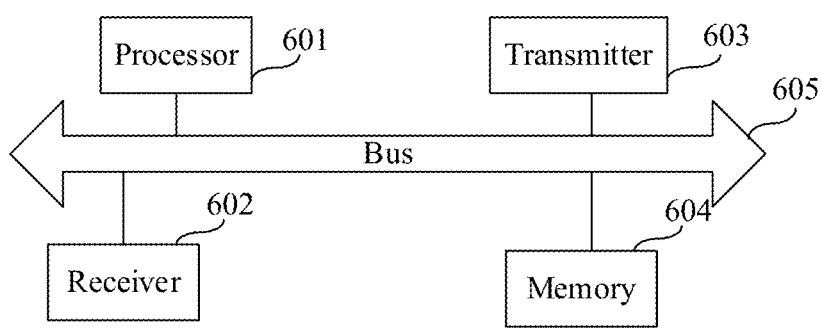
FIG. 12 is a structural schematic diagram illustrating a terminal, according to an exemplary embodiment.

FIG. 12 is a structure diagram of a terminal, according to an exemplary embodiment of the present disclosure. The terminal includes a processor 601, a receiver 602, a transmitter 603, a memory 604, and a bus 605.

The processor 601 includes one or more than one processing core. The processor 601 runs a software program and a module, thereby executing various function applications and information processing.

The receiver 602 and the transmitter 603 may be implemented as a communication component. The communication component may be a communication chip.

The memory 604 may be coupled with the processor 601 through the bus 605.

The memory 604 may be configured to store at least one instruction. The memory 604 is configured to execute the at least one instruction to implement each step in the above-mentioned method embodiments.

In addition, the memory 604 may be implemented using any type of volatile or non-volatile memory devices, or a combination thereof. The volatile or non-volatile memory device includes, but not limited to, a magnetic disk or optical disk, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

In an exemplary embodiment, there is also provided a non-transitory computer-readable storage medium including instructions, such as a memory including instructions. The instructions may be executed by a processor of a terminal to implement the method executed by the terminal side in the above-mentioned power configuration methods for multi-bandwidth transmission. For example, the non-transitory computer-readable storage medium may be a ROM, a random access memory (RAM), a compact disc read-only memory (CD-ROM), a magnetic tape, a floppy disc, and an optical data storage device.

A non-transitory computer-readable storage medium has instructions which is executed by a processor of a terminal to cause the terminal to execute the above-mentioned power configuration method for multi-bandwidth transmission.

Figure 13:
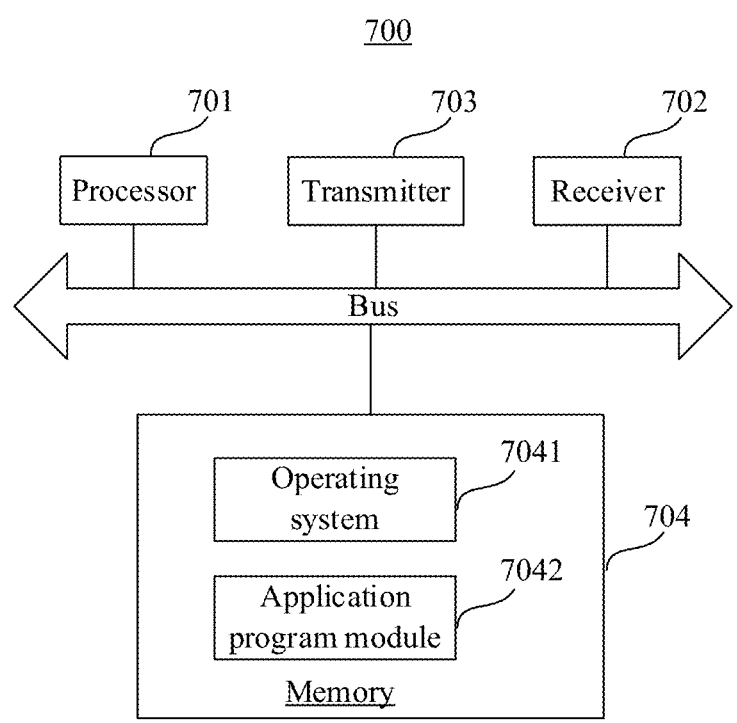
FIG. 13 is a block diagram of an access network device, according to an exemplary embodiment.

FIG. 13 is a block diagram of an access network device 700, according to an exemplary embodiment. The access network device 700 may be a base station.

The access network device 700 may include a processor 701, a receiver 702, a transmitter 703, and a memory 704. The receiver 702, the transmitter 703, and the memory 704 are coupled with the processor 701 through a bus respectively.

The processor 701 includes one or more than one processing core. The processor 701 runs a software program and a module to execute the method executed by an access network device in the power configuration methods for multi-bandwidth transmission in the embodiments of the present disclosure. The memory 704 may be configured to store the software program and the module. Specifically, the memory 704 may store an operating system 7041 and an application program module 7042 required by at least one function. The receiver 702 is configured to receive communication data sent by another device. The transmitter 703 is configured to send communication data to the other device.

An exemplary embodiment of the present disclosure also provides a power configuration system (or called a communication system) for multi-bandwidth transmission. The system includes a terminal and an access network device.

The terminal includes the power configuration apparatus for multi-bandwidth transmission in the embodiment illustrated in FIG. 11.

The access network includes the power configuration apparatus for multi-bandwidth transmission in the embodiment illustrated in FIG. 10.

An exemplary embodiment of the present disclosure also provides a power configuration system (or called a communication system) for multi-bandwidth transmission. The downlink signal receiving system includes a terminal and an access network device.

The terminal includes the terminal provided in the embodiment illustrated in FIG. 12.

The access network device includes the access network device provided in the embodiment illustrated in FIG. 13.

An exemplary embodiment of the present disclosure also provides a computer-readable storage medium having stored therein at least one instruction, at least one segment of program, a code set or an instruction set, which is loaded and executed by a processor to implement the steps executed by a terminal or an access network device in the power configuration method for multi-bandwidth transmission in any method embodiment.

It is to be understood that the term "multiple" in the present disclosure refers to two or more than two. "And/or" is an association relationship for describing associated objects and represents that three relationships may exist. For example, A and/or B may represent the following three cases: only A exists, both A and B exist, and only B exists. Character "/" generally indicates that the related objects are in an "or" relationship.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A power configuration method for multi-bandwidth transmission, comprising:
   determining, by a base station, a configuration upper limit of an overall equivalent power value of a terminal during multi-bandwidth transmission on n bandwidths, n being an integer greater than 1;
   generating, by the base station, configuration information of a first bandwidth in the n bandwidths for the terminal, the overall equivalent power value corresponding to the configuration information on the n bandwidths being not higher than the configuration upper limit; and sending, by the base station, the configuration information to the terminal, the configuration information being configured to configure a power configuration parameter for uplink sending of the terminal on the first bandwidth.

2. The method of claim 1, wherein the generating, by the base station, the configuration information of the first bandwidth in the n bandwidths for the terminal comprises:

acquiring, by the base station, an equivalent power value of the terminal corresponding to each bandwidth in the n bandwidths, the n bandwidths comprising the first bandwidth that is presently configured;

calculating, by the base station, the overall equivalent power value of the terminal according to the equivalent power value and a specified duty cycle of the terminal corresponding to each bandwidth; and generating, by the base station, the configuration information of the first bandwidth in response to determining that the overall equivalent power value is not higher than the configuration upper limit, the configuration information of the first bandwidth being configured to configure a first power value and/or a first duty cycle of the terminal on the first bandwidth.

3. The method of claim 2, wherein the calculating, by the base station, the overall equivalent power value of the terminal according to the equivalent power value and the specified duty cycle of the terminal corresponding to each bandwidth comprises:

for each bandwidth in the n bandwidths, multiplying the equivalent power value, the specified duty cycle, and an evaluation time window corresponding to the bandwidth to acquire a first product corresponding to the bandwidth, and accumulating the first products corresponding to the n bandwidths respectively to acquire the overall equivalent power value; or, for each bandwidth in the n bandwidths, multiplying the equivalent power value and the specified duty cycle corresponding to the bandwidth to acquire a second product corresponding to the bandwidth, and accumulating the second products corresponding to the n bandwidths respectively to acquire the overall equivalent power value.

4. The method of claim 2, wherein, for a jth bandwidth in the n bandwidths, an equivalent power value corresponding to the jth bandwidth is equal to:

$$P_{eq\_Band\_j} = (DC_{p1} \times P_1 \times T_1 + DC_{p2} \times P_2 \times T_2 + DC_{p3} \times P_3 \times T_3 + \ldots DC_{pi} \times P_i \times T_i + \ldots DC_{pn} \times P_n \times T_n)/(DC_{as\_j} \times T_{window}),$$

where $P_{eq\_Band\_j}$ is the equivalent power value corresponding to the jth bandwidth under the specified duty cycle, $DC_{as\_j}$ is the specified duty cycle corresponding to the jth bandwidth, $T_{window}$ is a whole evaluation time window, $DC_{pi}$ is a duty cycle in an ith sub evaluation time period, $P_i$ is power corresponding to a practical power class (PC) in the ith sub evaluation time period, and $T_i$ is the ith sub evaluation time period, each sub evaluation time period being non-overlapping, and i being an integer not greater than n.

5. The method of claim 2, wherein the acquiring, by the base station, the equivalent power value of the terminal corresponding to each bandwidth in the n bandwidths comprises:

calculating the equivalent power value corresponding to each bandwidth according to a default duty cycle and a preset power value corresponding to each bandwidth in the n bandwidths.

6. The method of claim 2, wherein the acquiring, by the base station, the equivalent power value of the terminal corresponding to each bandwidth in the n bandwidths comprises:

in response to determining that the first power value and the first duty cycle corresponding to the first bandwidth need to be adjusted, adjusting at least one of the first power value or the first duty cycle corresponding to the first bandwidth according to an adjustment requirement, and calculating the equivalent power value corresponding to the first bandwidth according to the first power value and the first duty cycle; and acquiring a second power value and a second duty cycle corresponding to a second bandwidth, except the first bandwidth, in the n bandwidths and calculating the equivalent power value corresponding to the second bandwidth according to the second power value and the second duty cycle; or, acquiring an equivalent power value corresponding to the second bandwidth, except the first bandwidth, in the n bandwidths.

7. The method of claim 6, further comprising:

decreasing, by the base station, the second power value and/or the second duty cycle corresponding to the second bandwidth in response to determining that the overall equivalent power value is higher than the configuration upper limit.

8. The method of claim 7, further comprising:

refusing, by the base station, to adjust the second power value and/or the second duty cycle corresponding to the second bandwidth in response to determining that a decreasing frequency is higher than a preset frequency and the overall equivalent power value is still higher than the configuration upper limit.

9. The method of claim 5, further comprising:

decreasing, by the base station, the first equivalent power value and/or the first duty cycle corresponding to the first bandwidth in response to determining that the overall equivalent power value is higher than the configuration upper limit and a service priority of the second bandwidth is higher than a service priority of the first bandwidth.

10. The method of claim 2, further comprising:

calculating a remaining equivalent power value quota according to the configuration upper limit and the overall equivalent power value in response to determining that the overall equivalent power value is not higher than the configuration upper limit;

adjusting at least one of a third power value or a third duty cycle corresponding to a third bandwidth according to an adjustment requirement in response to determining that an equivalent power value and a duty cycle corresponding to the third bandwidth need to be adjusted;

calculating an increment of the equivalent power value corresponding to the third bandwidth according to the third power value and/or the third duty cycle corresponding to the third bandwidth; and generating configuration information of the third bandwidth in response to determining that the increment of the equivalent power value corresponding to the third bandwidth is not higher than the remaining equivalent power value quota, configuration information of uplink transmit power being configured to configure the third power value and/or the third duty cycle of the terminal on the third bandwidth.

11. The method of claim 1, wherein the determining, by the base station, the configuration upper limit of the overall equivalent power value of the terminal during multi-bandwidth transmission on the n bandwidths comprises:
receiving, by the base station, the configuration upper limit of the overall equivalent power value from the terminal.

12. The method of claim 1, wherein the determining, by the base station, the configuration upper limit of the overall equivalent power value of the terminal during multi-bandwidth transmission on the n bandwidths comprises:
receiving, by the base station, a second sub configuration upper limit, from the terminal, corresponding to each bandwidth in the n bandwidths during multi-bandwidth transmission under a specified duty cycle; and
determining, by the base station, the configuration upper limit of the overall equivalent power value according to the second sub configuration upper limit corresponding to each bandwidth during multi-bandwidth transmission under the specified duty cycle.

13. The method of claim 12, wherein the determining, by the base station, the configuration upper limit of the overall equivalent power value according to the second sub configuration upper limit corresponding to each bandwidth during multi-bandwidth transmission under the specified duty cycle comprises:
multiplying, by the base station, the second sub configuration upper limit, the specified duty cycle, and an evaluation time window corresponding to each bandwidth during multi-bandwidth transmission under a preset duty cycle to acquire a third product, and adding, by the base station, the third products to determine the configuration upper limit of the overall equivalent power value; or,
multiplying, by the base station, the second sub configuration upper limit and the specified duty cycle corresponding to each bandwidth during multi-bandwidth transmission under a preset duty cycle to acquire a fourth product, and adding, by the base station, the fourth products to determine the configuration upper limit of the overall equivalent power value.

14. The method of claim 1, wherein the determining, by the base station, the configuration upper limit of the overall equivalent power value of the terminal during multi-bandwidth transmission on the n bandwidths comprises:
receiving, by the base station, a first sub configuration upper limit, from the terminal, corresponding to each bandwidth in the n bandwidths during independent work under a specified duty cycle;
determining, by the base station, a second sub configuration upper limit corresponding to each bandwidth during multi-bandwidth transmission according to the first sub configuration upper limit corresponding to each bandwidth during independent work under the specified duty cycle, the second sub configuration upper limit being lower than the first sub configuration upper limit; and
determining, by the base station, the configuration upper limit of the overall equivalent power value according to the specified duty cycle and the second sub configuration upper limit corresponding to each bandwidth during multi-bandwidth transmission.

15. The method of claim 14, wherein the determining, by the base station, the second sub configuration upper limit corresponding to each bandwidth during multi-bandwidth transmission according to the first sub configuration upper limit corresponding to each bandwidth during independent work under the specified duty cycle comprises:
calculating, by the base station, an average value of the first sub configuration upper limits of equivalent power values corresponding to the n bandwidths during independent work under corresponding PCs, and determining a quotient of the average value and n as the second sub configuration upper limit corresponding to each bandwidth during multi-bandwidth transmission; or,
calculating, by the base station, a maximum value of the first sub configuration upper limits of equivalent power values corresponding to the n bandwidths during independent work under corresponding PCs, and determining a quotient of the maximum value and n as the second sub configuration upper limit corresponding to each bandwidth during multi-bandwidth transmission; or,
calculating, by the base station, a minimum value of the first sub configuration upper limits of equivalent power values corresponding to the n bandwidths during independent work under corresponding PCs, and determining a quotient of the minimum value and n as the second sub configuration upper limit corresponding to each bandwidth during multi-bandwidth transmission; or,
calculating, by the base station, an average value of the first sub configuration upper limits of equivalent power values corresponding to the n bandwidths during independent work under corresponding PCs, and determining n divided values acquired by dividing the average value according to n weights as the second sub configuration upper limits corresponding to the n bandwidths during multi-bandwidth transmission, the n weights corresponding to the n bandwidths one to one, and a sum of the n weights being 1; or,
calculating, by the base station, a maximum value of the first sub configuration upper limits of equivalent power values corresponding to the n bandwidths during independent work under corresponding PCs, and determining n divided values acquired by dividing the maximum value according to n weights as the second sub configuration upper limits corresponding to the n bandwidths during multi-bandwidth transmission, the n weights corresponding to the n bandwidths one to one, and a sum of the n weights being 1; or,
calculating, by the base station, a minimum value of the first sub configuration upper limits of equivalent power values corresponding to the n bandwidths during independent work under corresponding PCs, and determining n divided values acquired by dividing the minimum value according to n weights as the second sub configuration upper limits corresponding to the n bandwidths during multi-bandwidth transmission, the n weights corresponding to the n bandwidths one to one, and a sum of the n weights being 1.

16. A power configuration method for multi-bandwidth transmission, comprising:
receiving, by a terminal, configuration information sent by a base station, an overall equivalent power value corresponding to the configuration information on n bandwidths for multi-band transmission being not higher than a configuration upper limit; and
determining, by the terminal, a power configuration parameter for uplink sending on a first bandwidth according to the configuration information, the first bandwidth being one or more of the n bandwidths for multi-bandwidth transmission of the terminal, and an overall equivalent duty cycle on the n bandwidths being not higher than the configuration upper limit.

17. The method of claim 16, before the receiving, by the terminal, the configuration information sent by the base station, further comprising:
reporting, by the terminal, the configuration upper limit of the overall equivalent power value to the base station; or,
reporting, by the terminal, a second sub configuration upper limit corresponding to each bandwidth in the n bandwidths during multi-bandwidth transmission under a specified duty cycle to the base station; or,
reporting, by the terminal, a first sub configuration upper limit of a power value corresponding to each bandwidth in the n bandwidths during independent work under a specified duty cycle to the base station.

18. The method of claim 17, before the reporting, by the terminal, the second sub configuration upper limit corresponding to each bandwidth in the n bandwidths under a specified duty cycle to the base station, comprising:
calculating, by the terminal, the second sub configuration upper limit corresponding to each bandwidth in the n bandwidths under the specified duty cycle according to a sub power value upper limit corresponding to a jth bandwidth in the n bandwidths in an ith sub evaluation time period, a corresponding duty cycle, and the corresponding ith sub evaluation time period.

19. A base station, comprising:
a processor; and
a transceiver coupled with the processor;
wherein the processor is configured to load and execute executable instructions to implement a power configuration method for multi-bandwidth transmission, the method comprising:
determining a configuration upper limit of an overall equivalent power value of a terminal during multi-bandwidth transmission on n bandwidths, n being an integer greater than 1;
generating configuration information of a first bandwidth in the n bandwidths for the terminal, the overall equivalent power value corresponding to the configuration information on the n bandwidths being not higher than the configuration upper limit; and
sending the configuration information to the terminal, the configuration information being configured to configure a power configuration parameter for uplink sending of the terminal on the first bandwidth.

20. A terminal implementing the method of claim 16, comprising:
a processor; and
a transceiver coupled with the processor;
wherein the processor is configured to load and execute executable instructions to to perform operations of the method.

* * * * *